(12) United States Patent
Nemoto et al.

(10) Patent No.: US 8,411,548 B2
(45) Date of Patent: Apr. 2, 2013

(54) OPTICAL PICKUP AND OPTICAL DISC APPARATUS

(75) Inventors: Kazuhiko Nemoto, Kanagawa (JP); Katsuhiro Seo, Kanagawa (JP); Tamotsu Ishii, Chiba (JP)

(73) Assignee: Sony Corporation, Tokyo (JP)

( * ) Notice: Subject to any disclaimer, the term of this patent is extended or adjusted under 35 U.S.C. 154(b) by 244 days.

(21) Appl. No.: 12/858,520

(22) Filed: Aug. 18, 2010

(65) Prior Publication Data
US 2011/0044152 A1    Feb. 24, 2011

(30) Foreign Application Priority Data
Aug. 22, 2009 (JP) ................ P2009-192646

(51) Int. Cl.
*G11B 7/13* (2012.01)
(52) U.S. Cl. ............ 369/112.01; 369/112.03; 369/44.41
(58) Field of Classification Search ........ 369/44.11, 369/53.11, 112.03, 112.01, 44.41
See application file for complete search history.

(56) References Cited

U.S. PATENT DOCUMENTS

| | | | |
|---|---|---|---|
| 7,227,819 B2 * | 6/2007 | Kadowaki et al. ......... 369/44.41 |
| 7,394,049 B2 * | 7/2008 | Nakao et al. ............... 250/201.5 |
| 7,428,201 B2 * | 9/2008 | Nakao et al. ............... 369/53.22 |
| 7,978,590 B2 * | 7/2011 | Ohta ......................... 369/124.12 |
| 2002/0041542 A1 * | 4/2002 | Sano et al. ................. 369/44.23 |
| 2005/0201220 A1 * | 9/2005 | Nishi ......................... 369/44.23 |
| 2006/0262695 A1 * | 11/2006 | Tsuchida et al. ............. 369/94 |
| 2008/0123492 A1 * | 5/2008 | Mori et al. .................. 369/53.11 |
| 2009/0201777 A1 * | 8/2009 | Ohta .......................... 369/44.32 |

FOREIGN PATENT DOCUMENTS
JP     10-255300    9/1998

* cited by examiner

*Primary Examiner* — Thomas Alunkal
(74) *Attorney, Agent, or Firm* — Wolf, Greenfield & Sacks, P.C.

(57) ABSTRACT

An optical pickup includes a light source emitting a light beam, a diffraction element diffracting the light beam to separate it into a main beam and a sub beam, an objective lens focusing the main and sub beams onto a desired recording layer of an optical disc, a lens moving section moving the objective lens in focusing and tracking directions, a light-separating element separating a reflected light beam, formed by reflecting each of the main and sub beams at the recording layer, into multiple beam components and allowing the reflected light beam to travel without rotating an image thereof, and a light-receiving element having multiple light-receiving regions that optically receive the reflected light beam and generating a light reception signal based on the amount of received light to allow a signal processing section to generate a focus error signal and a tracking error signal based on the light reception signal.

10 Claims, 19 Drawing Sheets

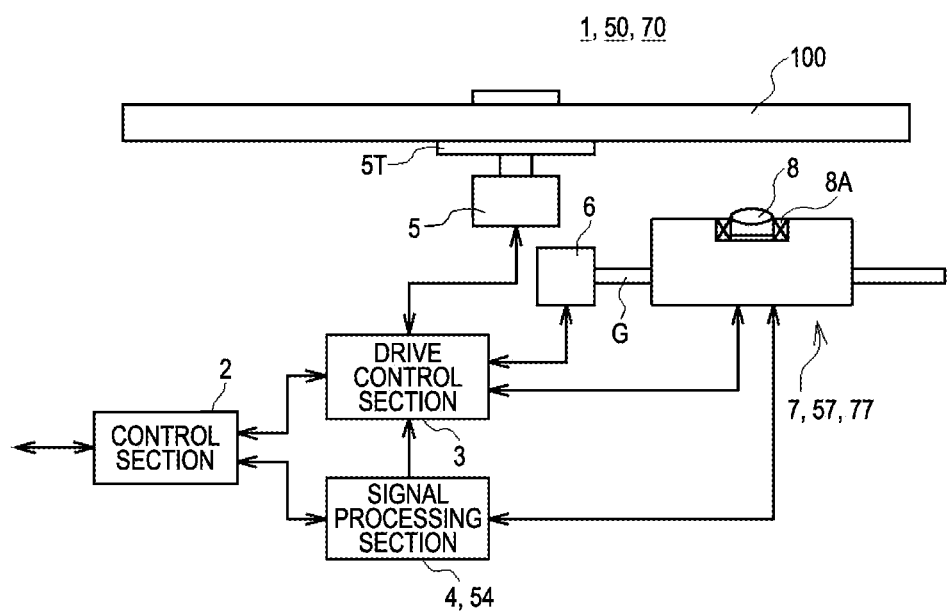

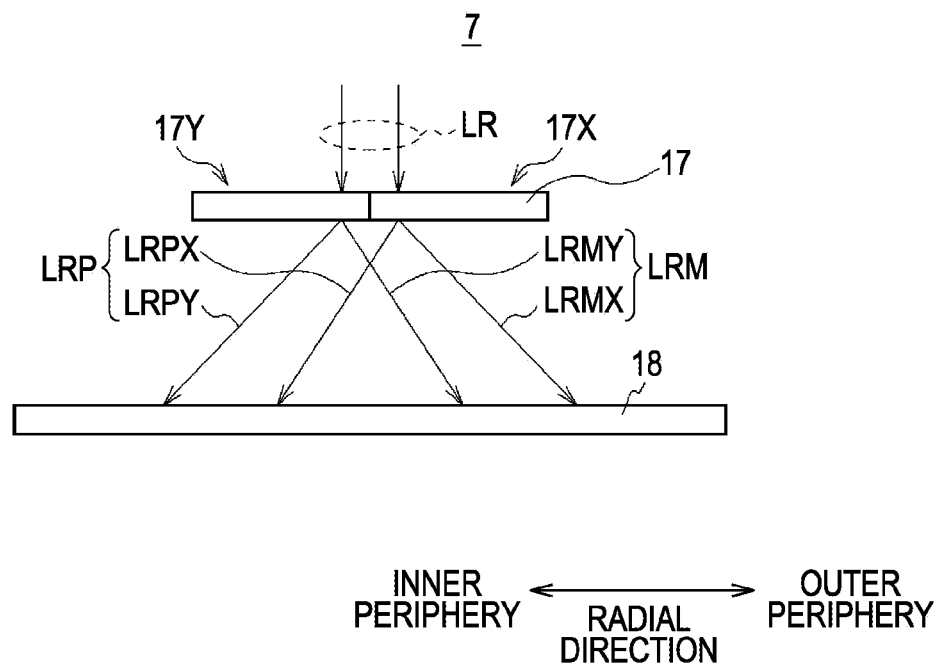

TANGENTIAL DIRECTION

TANGENTIAL DIRECTION

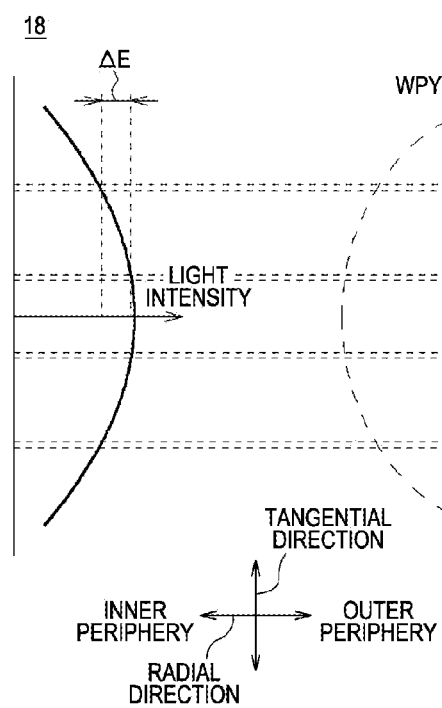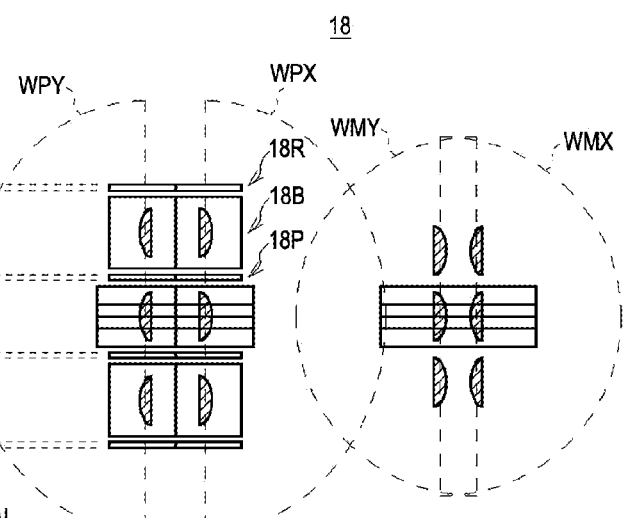
FIG. 9A
FIG. 9B

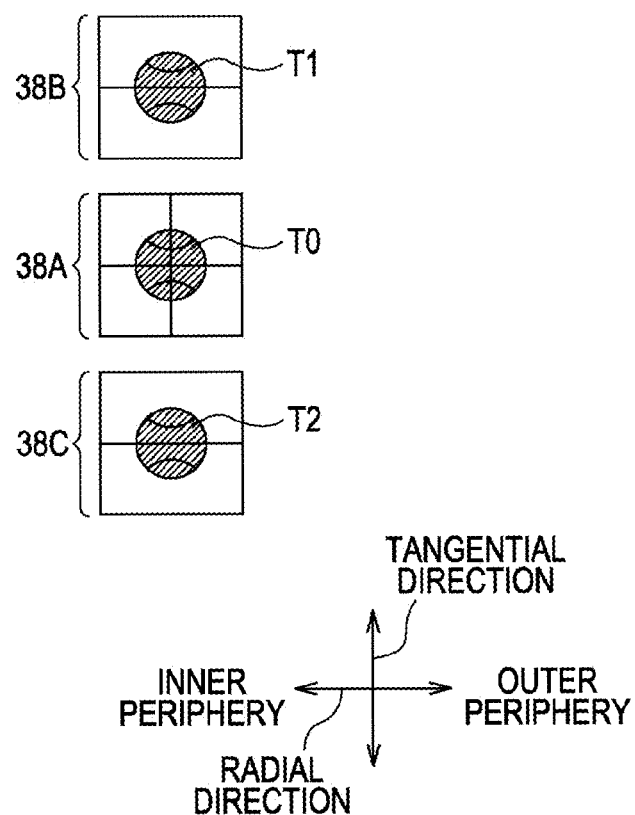

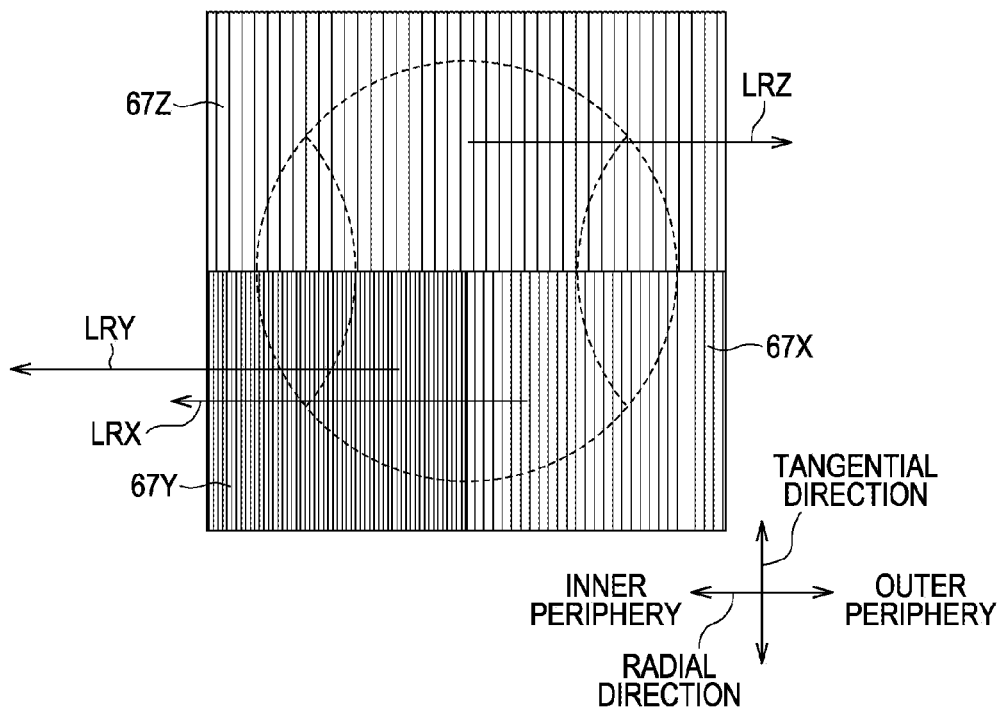
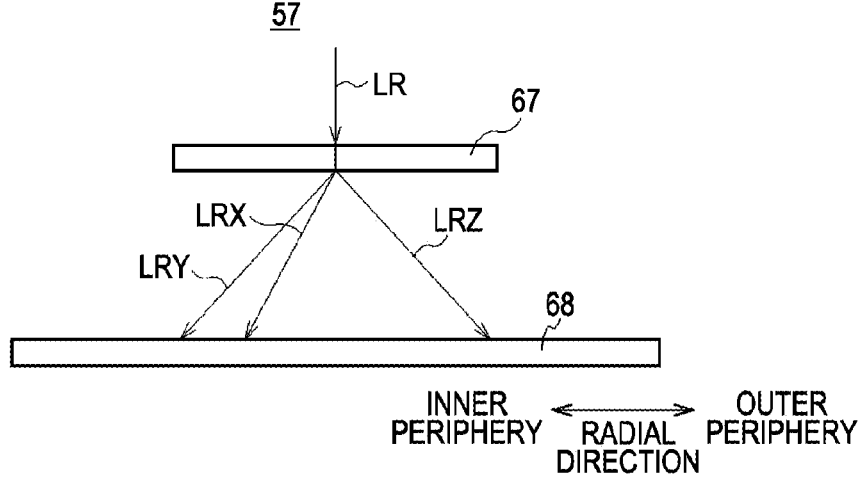

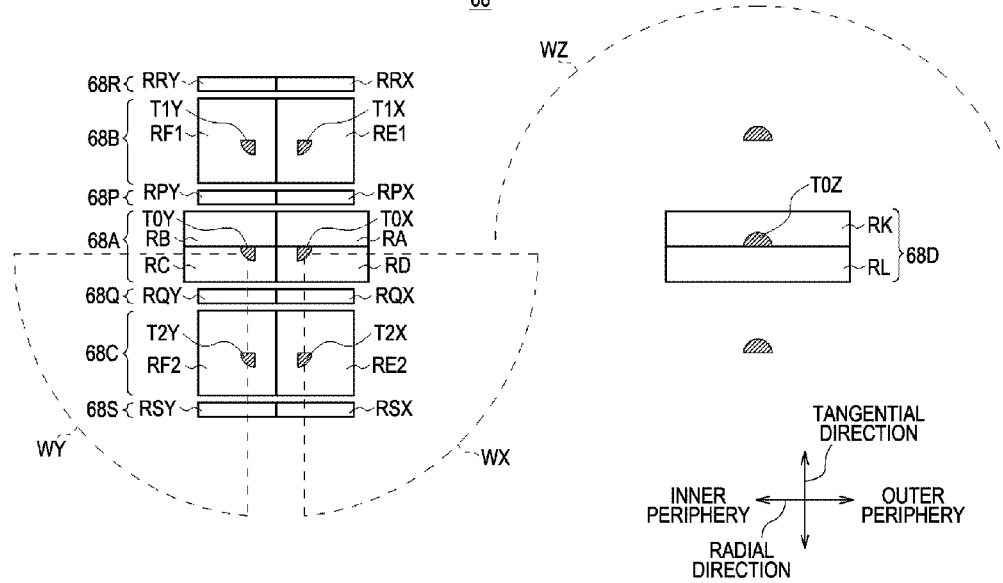

OPTICAL PICKUP AND OPTICAL DISC APPARATUS

BACKGROUND OF THE INVENTION

1. Field of the Invention

The present invention relates to optical pickups and optical disc apparatuses, and is suitably applied to, for example, an optical disc apparatus that records information on an optical disc.

2. Description of the Related Art

Optical disc apparatuses in the related art that are widely available are generally configured to record information on optical discs, such as compact discs (CD), digital versatile discs (DVD), or Blu-ray Discs (registered trademark, referred to as "BD" hereinafter), and to read the information from the optical discs.

An optical disc apparatus uses an objective lens to focus a light beam onto one of helical or concentric tracks formed on a recording layer of an optical disc, and follows the focal point of the light beam.

In this case, in the optical disc apparatus, a light-receiving region provided in a photo-detector optically receives a reflected light beam formed as a result of the light beam being reflected by the optical disc. On the basis of the reception result, the optical disc apparatus calculates a focus error signal and a tracking error signal that indicate an amount of deviation, in a focusing direction and a tracking direction, between the focal point of the light beam and a track at which the focal point of the light beam is to be set. Subsequently, the optical disc apparatus performs focus control and tracking control of the objective lens on the basis of the focus error signal and the tracking error signal.

Some DVD-format or BD-format optical discs are provided with multiple information recording layers so as to have an increased information recording capacity in a single optical disc. An optical disc having multiple recording layers will be referred to as "multilayer optical disc" hereinafter.

In principle, when a light beam is emitted from the optical disc apparatus to this multilayer optical disc, a portion of the light beam is reflected by a recording layer or layers other than a recording layer (referred to as "target recording layer" hereinafter) at which the optical disc apparatus tries to set the focal point of the light beam.

The light beam reflected at the other recording layer or layers is called "other-layer stray light" or "interlayer stray light". When stray light of this kind reaches the photo-detector, since the stray light is in a defocused state and is incident over a relatively large area on the photo-detector, the incident stray light can sometimes extend to the light-receiving region. In this case, in the optical disc apparatus, since a light reception signal contains an undesired component (stray-light component), the accuracy of the tracking control can possibly be reduced.

In view of this, some optical disc apparatuses are provided with a stray-light-receiving region for detecting the other-layer stray light near the light-receiving region and are configured to correct the light reception signal obtained in the light-receiving region by using a stray-light reception signal in accordance with the amount of light received in the stray-light-receiving region (for example, see Japanese Unexamined Patent Application Publication No. 10-255300 (FIG. 1)).

SUMMARY OF THE INVENTION

Regarding the reflected light beam, an incident spot thereof formed on the photo-detector has a so-called push-pull region where the light intensity changes in accordance with the amount of deviation of the focal point of the light beam in the tracking direction.

In light of this, a push-pull method for calculating a tracking error signal on the basis of the light intensity of this push-pull region has been proposed. One proposed example of a method of generating a tracking error signal by utilizing the light intensity of the push-pull region is a differential push-pull (DPP) method.

When using this DPP method, the optical disc apparatus diffracts the light beam so as to generate a main beam and two sub beams, and emits the beams and causes each of the beams to be reflected by the recording layer of the optical disc. Furthermore, in the optical disc apparatus, the photo-detector is provided with a main light-receiving region and two sub light-receiving regions that optically receive the main beam and the two sub beams and generate a main light reception signal and a sub light reception signal, respectively. Subsequently, the optical disc apparatus performs a predetermined calculation process using the main light reception signal and the sub light reception signal so as to generate a tracking error signal.

Furthermore, in order to cause energy to be concentrated in a desired section of the optical disc when recording information thereon, the optical disc apparatus is configured to increase the light-amount proportion for the main beam and to relatively reduce the light-amount proportion for the sub beams.

As a result, on the photo-detector of the optical disc apparatus, the light intensity of stray light produced due to the main beam and the light intensity of the sub beams undesirably become relatively close values. Therefore, even if the optical disc apparatus were to use a stray-light reception signal, it is difficult to appropriately correct the other-layer stray-light component included in the light reception signal, possibly reducing the accuracy of the tracking control.

Although there are various methods of calculating a focus error signal, a common method is an astigmatism method. When using this astigmatism method, the optical disc apparatus gives astigmatism to the reflected light beam by using, for example, a cylindrical lens.

When using this astigmatism method, the effect of the cylindrical lens in the optical disc apparatus causes the image of the reflected light beam to be rotated between when the reflected light beam becomes incident on the cylindrical lens and when the reflected light beam becomes incident on the photo-detector. Such an optical system of the optical disc apparatus will be referred to as "rotational optical system" hereinafter.

In a rotational optical system, the effect of the cylindrical lens causes the light-intensity distribution of the other-layer stray light to be deformed into a complicated form relative to a common Gaussian distribution, making it difficult to appropriately perform the correction using the reception result of the other-layer stray light.

Another method of calculating a focus error signal is a spot-size-detecting (SSD) method. In this SSD method, the reflected light beam is diffracted into positive first-order light and negative first-order light. Moreover, the focal point of one of the positive first-order light and the negative first-order light is set closer to the photo-detector, whereas the focal point of the other one of the positive first-order light and the negative first-order light is set farther from the photo-detector, and a focus error signal is generated on the basis of a difference in size of spots formed on the photo-detector by the positive first-order light and the negative first-order light.

When using the SSD method, the image of the reflected light beam is not rotated in the optical disc apparatus. Such an optical system of the optical disc apparatus will be referred to as "non-rotational optical system" hereinafter.

In the optical disc apparatus that uses such a non-rotational optical system, the effect the other-layer stray light has on the light reception signal is prominent, as compared with a rotational optical system, possibly leading to a significant reduction in the accuracy of the tracking control.

It is desirable to provide an optical pickup capable of supplying a light reception signal that can be used for generating a high quality tracking error signal in a non-rotational optical system, and also to provide an optical disc apparatus capable of performing tracking control with high accuracy in a non-rotational optical system.

An optical pickup according to an embodiment of the present invention includes a light source that emits a light beam; a diffraction element that diffracts the light beam so as to separate the light beam into a main beam made of zero-th order light and at least one sub beam made of diffracted light; an objective lens that focuses the main beam and the at least one sub beam of the light beam onto a desired recording layer of an optical disc, the desired recording layer being a single recording layer or one of two or more recording layers provided in the optical disc and having helical or concentric tracks formed thereon; a lens moving section that moves the objective lens in a focusing direction for moving the objective lens toward and away from the optical disc and a tracking direction for moving the objective lens toward an inner periphery or an outer periphery of the optical disc; a light-separating element that separates a reflected light beam, formed as a result of each of the main beam and the at least one sub beam of the light beam being reflected at the desired recording layer, into multiple beam components and allows the reflected light beam to travel without rotating an image thereof; and a light-receiving element that has multiple light-receiving regions that optically receive the reflected light beam and generates a light reception signal in accordance with the amount of received light so as to allow a predetermined signal processing section to generate a focus error signal and a tracking error signal on the basis of the light reception signal, the focus error signal and the tracking error signal indicating an amount of deviation between a focal point of the light beam and a desired one of the tracks in the focusing direction and the tracking direction, respectively. The light-receiving element includes a main light-receiving region that optically receives a light beam component separated from the main beam of the reflected light beam by the light-separating element and generates a main light reception signal in accordance with the amount of received light; a sub light-receiving region that is disposed beside the main light-receiving region in a tangential direction, corresponding to an extending direction of the tracks, in the image of the reflected light beam, the sub light-receiving region being configured to optically receive the at least one sub beam of the reflected light beam and to generate a sub light reception signal in accordance with the amount of received light; an inner stray-light-receiving region that is provided between the main light-receiving region and the sub light-receiving region, the inner stray-light-receiving region being configured to optically receive an interlayer stray light beam formed as a result of the light beam being reflected at an area other than the desired recording layer and to generate an inner stray-light reception signal in accordance with the amount of received light; and an outer stray-light-receiving region provided opposite the inner stray-light-receiving region with the sub light-receiving region therebetween in the tangential direction, the outer stray-light-receiving region being configured to optically receive the interlayer stray light beam and to generate an outer stray-light reception signal in accordance with the amount of received light. The main light reception signal, the sub light reception signal, the inner stray-light reception signal, and the outer stray-light reception signal are supplied to the signal processing section so as to allow the signal processing section to generate the focus error signal on the basis of the main light reception signal and generate the tracking error signal on the basis of the main light reception signal and the sub light reception signal corrected by an average sum value of the inner stray-light reception signal and the outer stray-light reception signal.

With the optical pickup according to the embodiment of the present invention, the light-separating element allows other-layer stray light to be incident over the inner stray-light-receiving region, the sub light-receiving region, and the outer stray-light-receiving region without causing rotation of or complicated deformation of the image of the other-layer stray light. Consequently, the optical pickup according to the embodiment of the present invention can allow the signal processing section to use the average sum value of the inner stray-light reception signal and the outer stray-light reception signal so as to appropriately correct a stray-light component included in the sub light reception signal. According to the embodiment of the present invention, an optical pickup capable of supplying a light reception signal that can be used for generating a high quality tracking error signal in a non-rotational optical system can be provided.

An optical disc apparatus according to an embodiment of the present invention includes a light source that emits a light beam; a diffraction element that diffracts the light beam so as to separate the light beam into a main beam made of zero-th order light and at least one sub beam made of diffracted light; an objective lens that focuses the main beam and the at least one sub beam of the light beam onto a desired recording layer of an optical disc, the desired recording layer being a single recording layer or one of two or more recording layers provided in the optical disc and having helical or concentric tracks formed thereon; a lens moving section that moves the objective lens in a focusing direction for moving the objective lens toward and away from the optical disc and a tracking direction for moving the objective lens toward an inner periphery or an outer periphery of the optical disc; a light-separating element that separates a reflected light beam, formed as a result of each of the main beam and the at least one sub beam of the light beam being reflected at the desired recording layer, into multiple beam components and allows the reflected light beam to travel without rotating an image thereof; a light-receiving element that has multiple light-receiving regions that optically receive the reflected light beam and generates a light reception signal in accordance with the amount of received light; and a signal processing section that generates a focus error signal and a tracking error signal on the basis of the light reception signal, the focus error signal and the tracking error signal indicating an amount of deviation between a focal point of the light beam and a desired one of the tracks in the focusing direction and the tracking direction, respectively. The light-receiving element includes a main light-receiving region that optically receives a light beam component separated from the main beam of the reflected light beam by the light-separating element and generates a main light reception signal in accordance with the amount of received light; a sub light-receiving region that is disposed beside the main light-receiving region in a tangential direction, corresponding to an extending direction of the tracks, in the image of the reflected light beam, the sub light-receiving region being configured to optically receive the at least one sub beam of the reflected light beam and to generate a sub light reception signal in accordance with the amount of received light; an inner stray-light-receiving region that is provided between the main light-receiving region and the sub light-receiving region, the inner stray-light-receiving region being configured to optically receive an interlayer stray light beam formed as a result of the light beam being reflected at an area other than the desired recording layer and to generate an inner stray-light reception signal in accordance with the amount of received light; and an outer stray-light-receiving region provided opposite the inner stray-light-receiving region with the sub light-receiving region therebetween in the tangential direction, the outer stray-light-receiving region being configured to optically receive the interlayer stray light beam and to generate an outer stray-light reception signal in accordance with the amount of received light. The signal processing section receives the main light reception signal, the sub light reception signal, the inner stray-light reception signal, and the outer stray-light reception signal so as to generate the focus error signal on the basis of the main light reception signal and generate the tracking error signal on the basis of the main light reception signal and the sub light reception signal corrected by an average sum value of the inner stray-light reception signal and the outer stray-light reception signal.

With the optical disc apparatus according to the embodiment of the present invention, the light-separating element allows other-layer stray light to be incident over the inner stray-light-receiving region, the sub light-receiving region, and the outer stray-light-receiving region without causing rotation of or complicated deformation of the image of the other-layer stray light. Consequently, the optical disc apparatus according to the embodiment of the present invention can use the average sum value of the inner stray-light reception signal and the outer stray-light reception signal so as to appropriately correct a stray-light component included in the sub light reception signal. According to the embodiment of the present invention, an optical disc apparatus capable of performing tracking control with high accuracy in a non-rotational optical system can be provided.

BRIEF DESCRIPTION OF THE DRAWINGS

FIG. 1 is a schematic diagram illustrating the overall configuration of an optical disc apparatus;

FIG. 6 is a schematic diagram illustrating how the light beam is diffracted and separated in the first embodiment;

FIGS. 9A and 9B are schematic diagrams illustrating a first light-intensity distribution of stray-light patterns;

FIG. 15 is a schematic diagram illustrating the configuration of a photo-detector that corresponds to the astigmatism method;

FIG. 18 is a schematic diagram illustrating the configuration of a hologram plate according to the second embodiment;

FIG. 19 is a schematic diagram illustrating how a light beam is diffracted and separated in the second embodiment;

FIG. 20 is a schematic diagram illustrating the configuration of a photo-detector according to the second embodiment.

DESCRIPTION OF THE PREFERRED EMBODIMENTS

Embodiments according to the present invention will be described below with reference to the drawings. The description below will proceed in the following order.

Figure 2A:
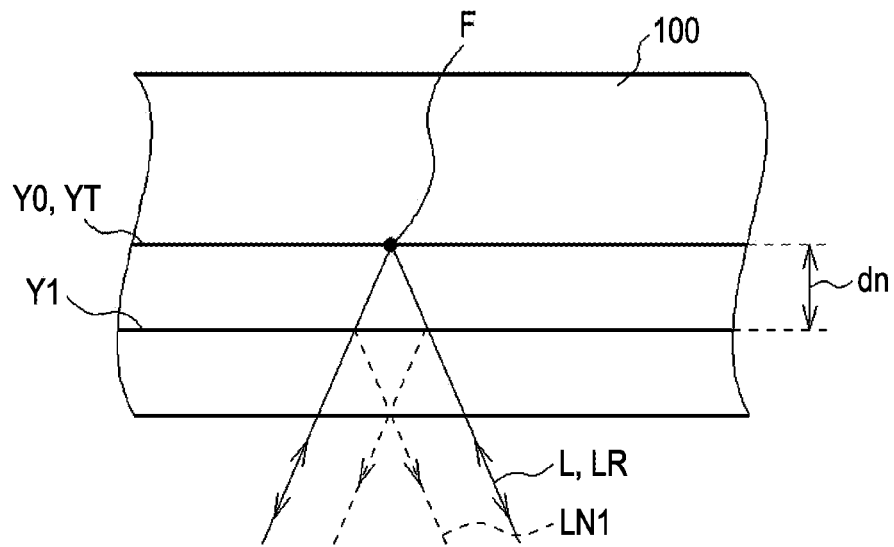
FIGS. 2A and 2B are schematic diagrams for explaining the configuration of an optical disc and how a light beam is reflected.

1. First Embodiment (Example of Generating Focus Error Signal by SSD Method)
2. Second Embodiment (Example of Generating Focus Error Signal by Foucault Method)
3. Third Embodiment (Example using Optical Integrated Unit)
4. Other Embodiments 1. First Embodiment 1.1. Configuration of Optical Disc Apparatus Referring to FIG. 1, an optical disc apparatus 1 is configured to record information on, for example, an optical disc 100 of a Blu-ray Disc (BD) type and to reproduce the information from the optical system 100. Referring to FIG. 2A, the optical disc 100 is provided with two recording layers Y0 and Y1.

The optical disc apparatus 1 is configured to control the entire system via a control section 2. The control section 2 is mainly constituted of a central processing unit (CPU) (not shown), and reads various programs from a read-only memory (ROM) (not shown) and opens the programs in a random access memory (RAM) (not shown). Thus, the control section 2 is configured to perform various kinds of processing, such as information recording processing and information reproduction processing.

For example, when recording information onto the optical disc 100, the control section 2 accepts an information record command, recording information, and recording address information from an external device (not shown) or the like, and supplies the recording address information and a drive command to a drive control section 3 and the recording information to a signal processing section 4. Specifically, the recording address information indicates an address at which the recording information is to be recorded.

The drive control section 3 drives and controls a spindle motor 5 in accordance with the drive command so as to rotate the optical disc 100 mounted on a turntable 5T at a predetermined rotation speed. Moreover, the drive control section 3 also drives and controls a spindle motor 6 so as to move an optical pickup 7 along a moving shaft G to a position corresponding to the recording address information in the radial direction (i.e., toward the inner periphery or the outer periphery) of the optical disc 100.

The signal processing section 4 generates a recording signal by performing various kinds of signal processing, such as predetermined encoding and predetermined modulation, on the supplied recording information and supplies the recording signal to the optical pickup 7.

The optical pickup 7 performs focus control and tracking control, to be described later, so as to set a focal point F of a light beam L at a desired recording layer Y (referred to as "target recording layer YT" hereinafter) in the optical disc 100. In addition, the optical pickup 7 adjusts the light intensity of the light beam L in accordance with the recording signal from the signal processing section 4 so as to record the information onto the recording layer of the optical disc 100.

On the other hand, when reproducing the information from the optical disc 100, the control section 2 accepts an information reproduction command or the like from, for example, an external device (not shown), and supplies a drive command to the drive control section 3 and the reproduction command to the signal processing section 4.

Similar to when recording information, the drive control section 3 rotates the optical disc 100 at a predetermined rotation speed and moves the optical pickup 7 to a position corresponding to the information reproduction command.

The optical pickup 7 performs focus control and tracking control, to be described later, so as to set the focal point F of the light beam L at the target recording layer YT in the optical disc 100, and also adjusts the light intensity of the light beam L for reproduction.

The light beam L is reflected by the recording layer so as to become a reflected light beam LR. The optical pickup 7 detects this reflected light beam LR and supplies a light reception signal according to the light amount thereof to the signal processing section 4.

The signal processing section 4 generates reproduction information by performing various kinds of signal processing, such as predetermined demodulation and predetermined decoding, on the supplied light reception signal and supplies the reproduction information to the control section 2. The control section 2 sends the reproduction information to the external device (not shown).

The optical disc apparatus 1 is configured to control the optical pickup 7 via the control section 2 in this manner so as to record the information onto the optical disc 100 and reproduce the information from the optical disc 100.

1.2. Configuration of Optical Pickup

Figure 3:
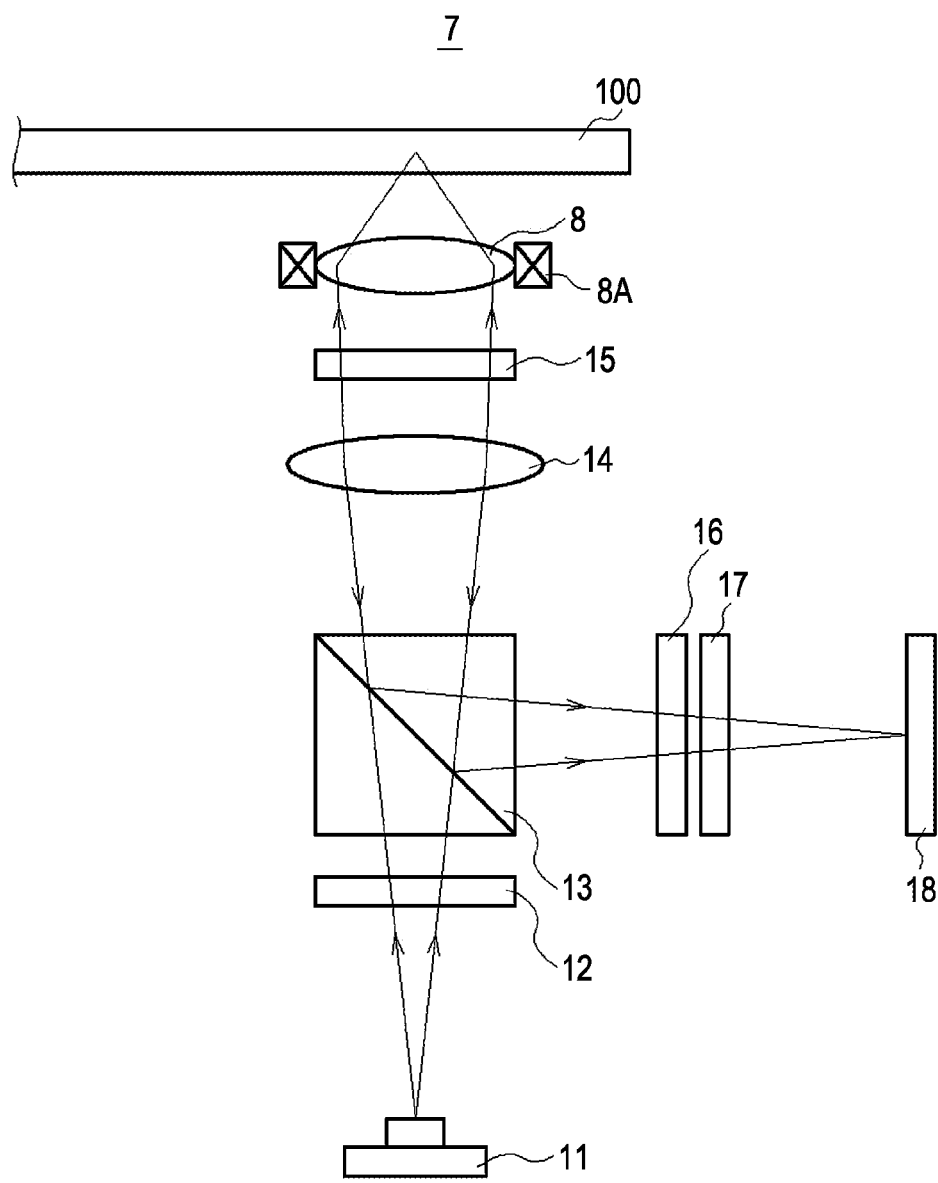
FIG. 3 is a schematic diagram illustrating the configuration of an optical pickup according to a first embodiment.

Next, the configuration of the optical pickup 7 will be described. As shown in FIG. 3, the optical pickup 7 is a combination of many optical components.

1.2.1. Overall Configuration of Optical Pickup

Under the control of the control section 2 and the signal processing section 4 (FIG. 1), a laser diode 11 emits the light beam L with a wavelength of about 405 nm towards a grating 12.

Specifically, the mounting position and the mounting angle of the laser diode 11 are adjusted so that the light beam L is p-polarized light. Due to the general properties of the laser diode 11, the light intensity distribution of the light beam L is a so-called Gaussian distribution.

The grating 12 separates the light beam L into a main beam and two sub beams and allows the separated beams to enter a polarizing beam splitter (PBS) 13. For the sake of convenience, the main beam and the two sub beams may be collectively referred to as "light beam L" hereinafter.

The polarizing beam splitter 13 is configured to reflect or transmit the light beam L via a polarizing surface 13S at a ratio according to the polarization direction of the light beam L. In actuality, the polarizing beam splitter 13 transmits a p-polarized component of the input light beam L, that is, substantially the entire light beam L, and allows the light beam L to be incident on a collimator lens 14.

The collimator lens 14 converts the light beam L from divergent light to collimated light and allows the collimated light beam L to be incident on a quarter-wave plate 15. The quarter-wave plate 15 is configured to interconvert the light beam L between linearly polarized light and circularly polarized light, and converts the light beam L made of p-polarized light to, for example, left circularly polarized light and allows the light beam L to be incident on an objective lens 8.

Under the control of the drive control section 3, the objective lens 8 is moved in a focusing direction and a tracking direction by an actuator 8A so as to be focus-controlled and tracking-controlled.

Specifically, the focusing direction is a direction in which the objective lens 8 moves toward and away from the optical disc 100 (i.e., the vertical direction in FIG. 3), whereas the tracking direction is a direction in which the objective lens 8 moves toward the inner periphery and the outer periphery of the optical disc 100 (i.e., the horizontal direction in FIG. 3).

The objective lens 8 collects the light beam L and emits the light beam L toward the optical disc 100. In this case, as shown in FIG. 2A, the objective lens 8 sets the focal point F of the light beam L at the target recording layer YT (in this case, the recording layer Y0).

Figure 4:
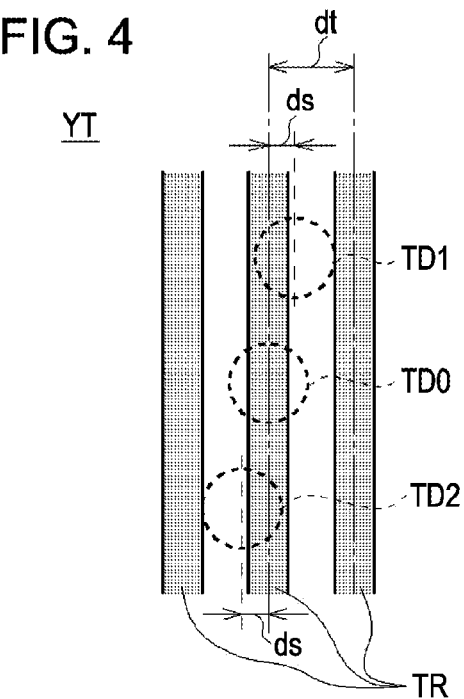
FIG. 4 is a schematic diagram illustrating beam spots formed on the optical disc.

Referring to FIG. 4, a spot TD0 is formed by the main beam and spots TD1 and TD2 are formed by the sub beams on the target recording layer YT of the optical disc 100.

As viewed in the tracking direction, the spots TD1 and TD2 are formed on opposite sides of the spot TD0 at positions distant therefrom by a spot distance ds. In the optical pickup 7, the optical properties of the grating 12 and the like are adjusted so that the spot distance ds is ¼ of a track pitch dt.

A portion of each of the main beam and the two sub beams of the light beam L is reflected at the target recording layer YT. The reflected portions of the main beam and the two sub beams may be collectively referred to as "reflected light beam LR" hereinafter. Specifically, because the turning direction of circularly polarized light is inverted at the time of the reflection, the reflected light beam LR becomes right circularly polarized light.

The reflected light beam LR is converted from divergent light to collimated light by the objective lens 8 (FIG. 3), is then converted from right circularly polarized light to s-polarized light by the quarter-wave plate 15, and is subsequently converted to convergent light by the collimator lens 14 before entering the polarizing beam splitter 13.

The polarizing beam splitter 13 reflects the reflected light beam LR made of s-polarized light at the polarizing surface 13S and allows the s-polarized reflected light beam LR to be incident on a lens 16. The lens 16 collects the reflected light beam LR and allows the reflected light beam LR to be incident on a hologram plate 17.

The hologram plate 17 gives a diffraction effect to the reflected light beam LR so as to separate the reflected light beam LR into multiple beam components, and emits the beam components to a photo-detector 18 (to be described later in detail).

The photo-detector 18 has a plurality of light-receiving regions R that optically receive the emitted beam components of the reflected light beam LR, generates a light reception signal U according to the amount of light received by each light-receiving region R, and supplies the light reception signal U to the signal processing section 4 (to be described later in detail).

The signal processing section 4 performs a calculation process on the basis of the light reception signal U so as to generate a focus error signal, a tracking error signal, and a reproduction RF signal (to be described later in detail).

1.2.2. Configuration of Hologram Plate

Figure 5:
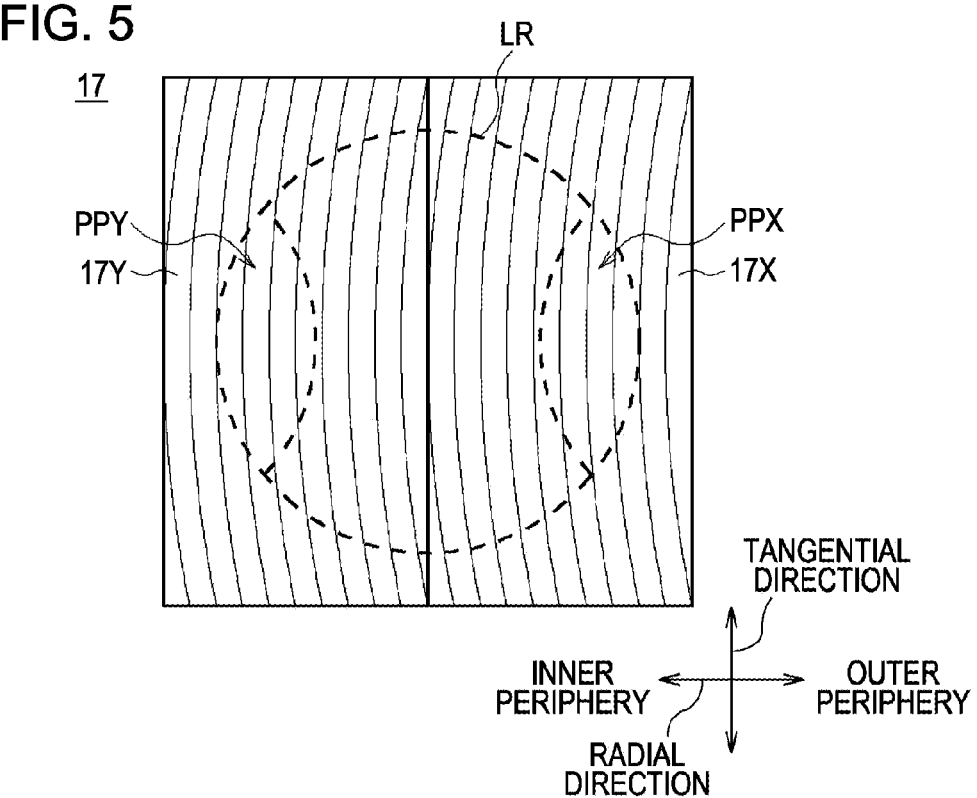
FIG. 5 is a schematic diagram illustrating the configuration of a hologram plate according to the first embodiment.

Referring to FIG. 5, the hologram plate 17 is divided into two regions 17X and 17Y having substantially the same size.

In FIG. 5, with respect to an image of the reflected light beam LR, the traveling direction (i.e., the tangential direction) of tracks formed in the target recording layer YT of the optical disc 100 is the vertical direction of the drawing, whereas the inner peripheral side and the outer peripheral side are the left side and the right side, respectively, of the drawing.

As is apparent from FIG. 5, push-pull regions PPX and PPY in the image of the reflected light beam LR are distributed separately in the radial direction.

In accordance with this distribution, the two regions 17X and 17Y are divided in the radial direction by a boundary line (i.e., a dividing line) extending in the tangential direction, thereby forming holograms having different properties.

The region 17X diffracts a portion of the reflected light beam LR that is incident on the region 17X so as to generate positive and negative reflected light beams LRPX and LRMX made of first-order light, as shown in FIG. 6. The reflected light beams LRPX and LRMX are then emitted to the photo-detector 18.

In this case, the region 17X diffracts the reflected light beam LRPX toward the inner periphery and the reflected light beam LRMX toward the outer periphery, but diffracts the reflected light beam LRMX by a diffraction angle greater than that for the reflected light beam LRPX so as to cause the reflected light beam LRMX to travel slightly further toward the outer periphery (the right side in FIG. 6).

The region 17Y diffracts a portion of the reflected light beam LR that is incident on the region 17Y so as to generate positive and negative reflected light beams LRPY and LRMY made of first-order light, as shown in FIG. 6. The reflected light beams LRPY and LRMY are then emitted to the photo-detector 18.

In this case, the region 17Y diffracts the reflected light beam LRPY toward the inner periphery and the reflected light beam LRMY toward the outer periphery, but diffracts the reflected light beam LRPY by a diffraction angle greater than that for the reflected light beam LRMY so as to cause the reflected light beam LRPY to travel slightly further toward the inner periphery (the left side in FIG. 6).

As a result, the reflected light beams LRPX and LRPY (collectively referred to as "positive reflected light beam LRP" hereinafter) are both diffracted toward the inner periphery but travel away from each other in the radial direction. Likewise, the reflected light beams LRMX and LRMY (collectively referred to as "negative reflected light beam LRM" hereinafter) are both diffracted toward the outer periphery but travel away from each other in the radial direction.

Furthermore, in order to be able to perform focus control based on a spot-size-detecting (SSD) method, the regions 17X and 17Y of the hologram plate 17 are configured to make the focal point of the positive reflected light beam LRP different from the focal point of the negative reflected light beam LRM.

Figure 7A:
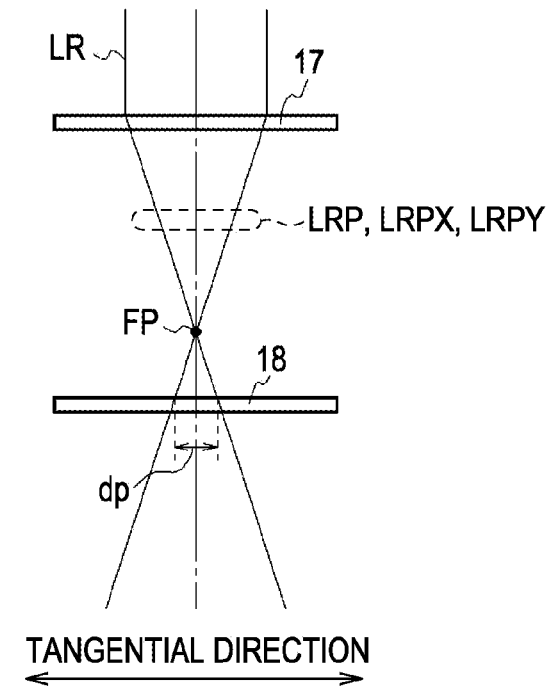
FIGS. 7A and 7B are schematic diagrams for explaining positional displacement of a focal point by the hologram plate.

Specifically, referring to FIG. 7A, due to the effect of the formed holograms, the regions 17X and 17Y cause a focal point FP of the positive reflected light beam LRP (LRPX and LRPY) in the tangential direction to be formed in front of (above in FIG. 7A) the photo-detector 18.

Figure 7B:
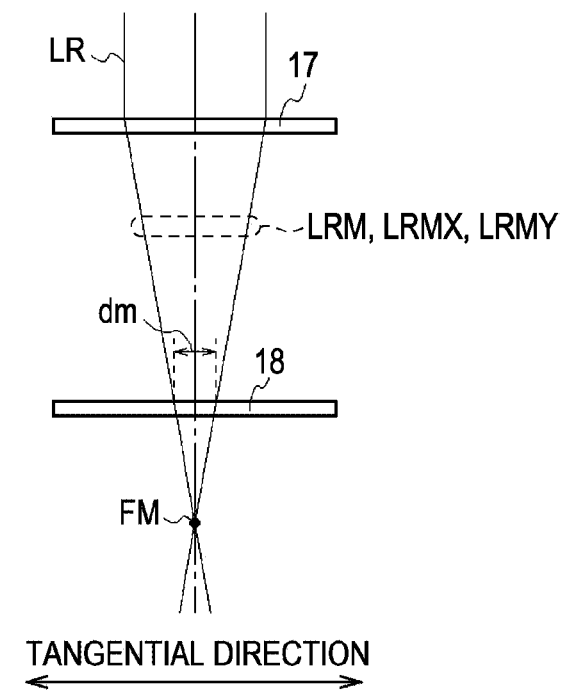

Furthermore, referring to FIG. 7B, due to the effect of the formed holograms, the regions 17X and 17Y cause a focal point FM of the negative reflected light beam LRM (LRMX and LRMY) in the tangential direction to be formed behind (below in FIG. 7B) the photo-detector 18.

The properties and the mounting positions of the optical components in the optical pickup 7 are adjusted so that, when the focal point F (FIG. 2A) of the light beam L is set at the target recording layer YT, lengths dp and dm, in the tangential direction, of the spots formed on the photo-detector 18 by the positive reflected light beam LRP and the negative reflected light beam LRM are substantially equal to each other.

Specifically, the hologram plate 17 is configured to separate and diffract each of the main beam and the two sub beams of the reflected light beam LR in each region, and also to vary the focal points thereof.

In this manner, the hologram plate 17 separates each reflected light beam LR into two beams toward the outer periphery and the inner periphery and causes the separated beams to travel away from each other. In addition, the hologram plate 17 diffracts each of the separated beams so as to cause a plurality of reflected light beams LR to travel in a separated manner.

1.2.3. Configuration of Photo-Detector 1.2.3.1. Configuration of Light-Receiving Regions Referring to FIG. 8, the photo-detector 18 is provided with a plurality of light-receiving region groups 18A, 18B, 18C, and 18D for optically receiving the reflected light beam LR.

On the photo-detector 18, beam spots T0PX and T0PY are formed by the main beams of the positive reflected light beams LRPX and LRPY, beam spots T1PX and T2PX are formed by the two sub beams of the positive reflected light beam LRPX, and beam spots T1PY and T2PY are formed by the two sub beams of the positive reflected light beam LRPY.

Moreover, on the photo-detector 18, beam spots T0MX and T0MY are formed by the main beams of the negative reflected light beams LRMX and LRMY, beam spots T1MX and T2MX are formed by the two sub beams of the negative reflected light beam LRMX, and beam spots T1MY and T2MY are formed by the two sub beams of the negative reflected light beam LRMY.

Specifically, the optical pickup 7 corresponds to a non-rotational optical system mentioned above. Therefore, in the optical pickup 7, the push-pull regions PPX and PPY (FIG. 5) extend in the radial direction in both the image of the reflected light beam LR incident on the hologram plate 17 and the beam spots T formed on the photo-detector 18.

The light-receiving region groups 18A, 18B, and 18C are respectively disposed at sections corresponding to the beam spots T0PX and T0PY, the beam spots T1PX and T1PY, and the beam spots T2PX and T2PY formed by the positive reflected light beams LRPX and LRPY.

The light-receiving region groups 18A, 18B, and 18C are each divided into the inner peripheral side and the outer peripheral side in the radial direction and are capable of independently detecting the amount of light in the beam spots T0PX and T0PY, T1PX and T1PY, and T2PX and T2PY, respectively, formed distant from each other in the radial direction.

The light-receiving region group 18A is divided into two regions in the radial direction and into four regions in the tangential direction so as to be provided with outer-peripheral light-receiving regions RNA, RZA, RZD, and RMD and inner-peripheral light-receiving regions RNB, RZB, RZC, and RMC. Each of the light-receiving regions R in the light-receiving region group 18A will be referred to as "main light-receiving region" hereinafter.

In the outer-peripheral light-receiving regions RNA, RZA, RZD, and RMD of the main light-receiving regions, the beam spot T0PX is formed by the main beam of the positive reflected light beam LRPX. In the inner-peripheral light-receiving regions RNB, RZB, RZC, and RMC of the main light-receiving regions, the beam spot T0PY is formed by the main beam of the positive reflected light beam LRPY.

Here, hypothetical light-receiving regions RA, RB, RC, and RD are supposedly formed by combining the light-receiving regions RNA and RZA, the light-receiving regions RNB and RZB, the light-receiving regions RMC and RZC, and the light-receiving regions RMD and RZD, respectively. Each of the light-receiving regions of the light-receiving region group 18A is given a shape such that the hypothetical light-receiving regions RA, RB, RC, and RD are equivalent to four grid-like segments obtained by equally dividing the entire light-receiving region group 18A.

Furthermore, hypothetical light-receiving regions RM, RN, and RZ are supposedly formed by combining the light-receiving regions RMC and RMD, the light-receiving regions RNA and RNB, and the light-receiving regions RZA, RZB, RZC, and RZD, respectively. Each of the light-receiving regions of the light-receiving region group 18A is given a shape such that the hypothetical light-receiving regions RM, RN, and RZ are equivalent to three segments obtained by dividing the entire light-receiving region group 18A at a predetermined ratio in the tangential direction.

The light-receiving regions RNA, RZA, RZD, RMD, RNB, RZB, RZC, and RMC respectively generate light reception signals UNA, UZA, UZD, UMD, UNB, UZB, UZC, and UMC in accordance with the amount of received light, and supply the light reception signals to the signal processing section 4 (FIG. 1).

The light-receiving region group 18B (FIG. 8) is divided into an outer-peripheral light-receiving region RE1 and an inner-peripheral light-receiving region RF1. In the light-receiving region RE1 and the light-receiving region RF1, the beam spots T1PX and T1PY are formed by the sub beams of the positive reflected light beams LRPX and LRPY.

The light-receiving region RE1 and the light-receiving region RF1 respectively generate light reception signals UE1 and UF1 in accordance with the amount of received light, and supply the light reception signals to the signal processing section 4 (FIG. 1).

The light-receiving region group 18C (FIG. 8) is divided into an outer-peripheral light-receiving region RE2 and an inner-peripheral light-receiving region RF2. In the light-receiving region RE2 and the light-receiving region RF2, the beam spots T2PX and T2PY are formed by the sub beams of the positive reflected light beams LRPX and LRPY.

The light-receiving region RE2 and the light-receiving region RF2 respectively generate light reception signals UE2 and UF2 in accordance with the amount of received light, and supply the light reception signals to the signal processing section 4 (FIG. 1). Each of the light-receiving regions in the light-receiving region groups 18B and 18C will be referred to as "sub light-receiving region" hereinafter.

The light-receiving region group 18D (FIG. 8) is divided into three light-receiving regions RK, RW, and RL in the tangential direction. The dividing ratio between the light-receiving regions RK, RW, and RL is the same as the dividing ratio between the hypothetical light-receiving regions RM, RN, and RZ of the light-receiving region group 18A.

In the light-receiving region group 18D, the beam spots T0MX and T0MY are formed by the main beams of the negative reflected light beams LRMX and LRMY.

The light-receiving regions RK, RW, and RL respectively generate light reception signals UK, UW, and UL in accordance with the amount of received light, and supply the light reception signals to the signal processing section 4 (FIG. 1).

1.2.3.2. Configuration of Stray-Light Receiving Regions

In the optical disc 100 (FIG. 2A), a portion of the light beam L is reflected at the recording layer Y1 different from the target recording layer YT so that a stray light beam LN from the other layer, that is, the recording layer Y1 (referred to as "other-layer stray-light beam LN" hereinafter), is generated.

This other-layer stray-light beam LN travels within the optical pickup 7 along an optical path that is the same as that of the reflected light beam LR, and is diffracted by the hologram plate 17 in each region thereof before being emitted to the photo-detector 18.

Since the other-layer stray-light beam LN has an optical path length that is different from that of the reflected light beam LR reflected at the target recording layer YT, the other-layer stray-light beam LN is made incident on the photo-detector 18 in a defocused state, thus forming stray-light patterns WPX, WPY, WMX, and WMY extending over a relatively wide range.

Specifically, although stray-light beam spots corresponding to the sub beams are also formed on the photo-detector 18 in principle, the light intensity thereof is low and the effect they have on the light reception signals is extremely small. Therefore, FIG. 8 only shows the stray-light patterns WPX, WPY, WMX, and WMY (collectively referred to as "stray-light patterns W" hereinafter) corresponding to the main beams.

In order to correspond to the stray-light patterns W, the photo-detector 18 is provided with stray-light-receiving region groups 18P, 18Q, 18R, and 18S near the light-receiving region groups 18A, 18B, and 18C described above.

The stray-light-receiving region group 18P is disposed between the light-receiving region groups 18A and 18B, and the stray-light-receiving region group 18Q is disposed between the light-receiving region groups 18A and 18C. The stray-light-receiving region group 18R is provided at the opposite side of the stray-light-receiving region group 18P with the light-receiving region group 18B therebetween, as viewed in the tangential direction. The stray-light-receiving region group 18S is provided at the opposite side of the stray-light-receiving region group 18Q with the light-receiving region group 18C therebetween.

Specifically, the stray-light-receiving region groups 18P and 18Q are disposed closer to a center point Q2 of the light-receiving region group 18A, which is also the center of the stray-light patterns WPX and WPY, than the light-receiving region groups 18B and 18C. Each of stray-light-receiving regions R in the stray-light-receiving region groups 18P and 18Q will be referred to as "inner stray-light-receiving region" hereinafter.

On the other hand, the stray-light-receiving region groups 18R and 18S are disposed farther from the center point Q2 of the light-receiving region group 18A than the light-receiving region groups 18B and 18C. Each of stray-light-receiving regions R in the stray-light-receiving region groups 18R and 18S will be referred to as "outer stray-light-receiving region" hereinafter.

The stray-light-receiving region groups 18P, 18Q, 18R, and 18S are each divided into two regions in the radial direction so as to be constituted of stray-light-receiving regions RPX and RPY, RQX and RQY, RRX and RRY, and RSX and RSY, respectively.

The stray-light-receiving regions RPX, RQX, RRX, and RSX have the same length and position in the radial direction as the light-receiving regions RE1 and RE2. The stray-light-receiving regions RPY, RQY, RRY, and RSY have the same length and position in the radial direction as the light-receiving regions RF1 and RF2.

The stray-light-receiving regions RPX, RPY, RQX, RQY, RRX, RRY, RSX, and RSY have substantially the same width in the tangential direction, and therefore have substantially the same area. Specifically, each stray-light-receiving region has an elongate shape whose width in the tangential direction is extremely small as compared with the length in the radial direction.

The stray-light-receiving regions RPX, RPY, RQX, RQY, RRX, RRY, RSX, and RSY respectively generate stray-light reception signals UPX, UPY, UQX, UQY, URX, URY, USX, and USY in accordance with the amount of received light, and supply these signals to the signal processing section 4 (FIG. 1).

In this manner, the photo-detector 18 uses the light-receiving regions R and the stray-light-receiving regions R to generate the light reception signals U and the stray-light reception signals U, and supplies these signals to the signal processing section 4 (FIG. 1).

1.3. Correction of Other-Layer Stray-Light Components 1.3.1. Generation of Various Signals On the basis of the light reception signals U, the signal processing section 4 (FIG. 1) is configured to generate a focus error signal based on the SSD method, a tracking error signal based on a differential push-pull (DPP) method or a differential phase detect (DPD) method, and a reproduction RF signal.

First, on the basis of the light reception signals U, the signal processing section 4 calculates original light reception values SE0 and SF0 as sum values of light reception signals with respect to the inner-peripheral and outer-peripheral sub light-receiving regions in accordance with the following equations (1) and (2):

$$SE0=UE1+UE2 \quad (1)$$

$$SF0=UF1+UF2 \quad (2)$$

The original light reception values SE0 and SF0 each correspond to a value obtained by adding the light intensity of the other-layer stray-light beam LN to the light intensity of each of the two sub beams.

On the basis of the light reception signals U, the signal processing section 4 also calculates stray-light values SX and SY corresponding to the light amount of stray light in accordance with the following equations (3) and (4):

$$SX=UPX+UQX+URX+USX \quad (3)$$

$$SY=UPY+UQY+URY+USY \quad (4)$$

Specifically, the signal processing section 4 adds the light intensity of stray light in sections closer to the center point Q2 of the light-receiving region group 18A than the light-receiving region groups 18B and 18C and the light intensity of stray light in sections farther from the center point Q2 of the light-receiving region group 18A than the light-receiving region groups 18B and 18C and obtains average values so as to calculate the stray-light values SX and SY at the outer peripheral side and the inner peripheral side.

Moreover, the signal processing section 4 calculates sub light reception values SE and SF by correcting the original light reception values SE0 and SF0 using the stray-light values SX and SY and a predetermined coefficient α in accordance with the following equations (5) and (6):

$$SE=SE0-\alpha \cdot SX \quad (5)$$

$$SF=SF0-\alpha \cdot SY \quad (6)$$

In this case, the coefficient α is a value determined on the basis of, for example, a preliminarily obtained measurement value and an area ratio between the light-receiving region RE1 and the stray-light-receiving region RPX. Therefore, in accordance with the calculations using equations (5) and (6), the sub light reception values SE and SF are values, corresponding to the light intensity of the two sub beams, obtained by cancelling out components originating from the stray-light patterns WPX and WPY from the original light reception values SE0 and SF0.

Furthermore, the signal processing section 4 calculates main light reception values SA, SB, SC, and SD corresponding to the light reception results of the main beams in accordance with the following equations (7) to (10):

$$SA=UZA+UNA \quad (7)$$

$$SB=UZB+UNB \quad (8)$$

$$SC=UZC+UMC \quad (9)$$

$$SD=UZD+UMD \quad (10)$$

Here, the signal processing section 4 is configured to change a tracking-error-signal calculation method depending on the type of optical disc 100. For example, if the optical disc 100 is a DVD-ROM medium having a pit structure, the signal processing section 4 calculates a tracking error signal using the DPD method.

In detail, on the basis of the main light reception values SA, SB, SC, and SD, the signal processing section 4 first calculates phase signals φA, φB, φC, and φD indicating the phases of the main light reception values SA, SB, SC, and SD. Then, the signal processing section 4 calculates a tracking error signal STE in accordance with the following equation (11) and supplies the tracking error signal STE to the drive control section 3.

$$STE=(\phi A-\phi B)+(\phi C-\phi D) \quad (11)$$

On the other hand, if the optical disc 100 is a medium of another type, the signal processing section 4 calculates a tracking error signal using the DPP method.

In detail, the signal processing section 4 calculates the tracking error signal STE in accordance with the following equation (12) by using the main light reception values SA, SB, SC, and SD, the sub light reception values SE and SF, and a predetermined coefficient k, and supplies the tracking error signal STE to the drive control section 3.

$$STE = \{(SA+SD)-(SB+SC)\} - k(SE-SF) \quad (12)$$

Figure 8:
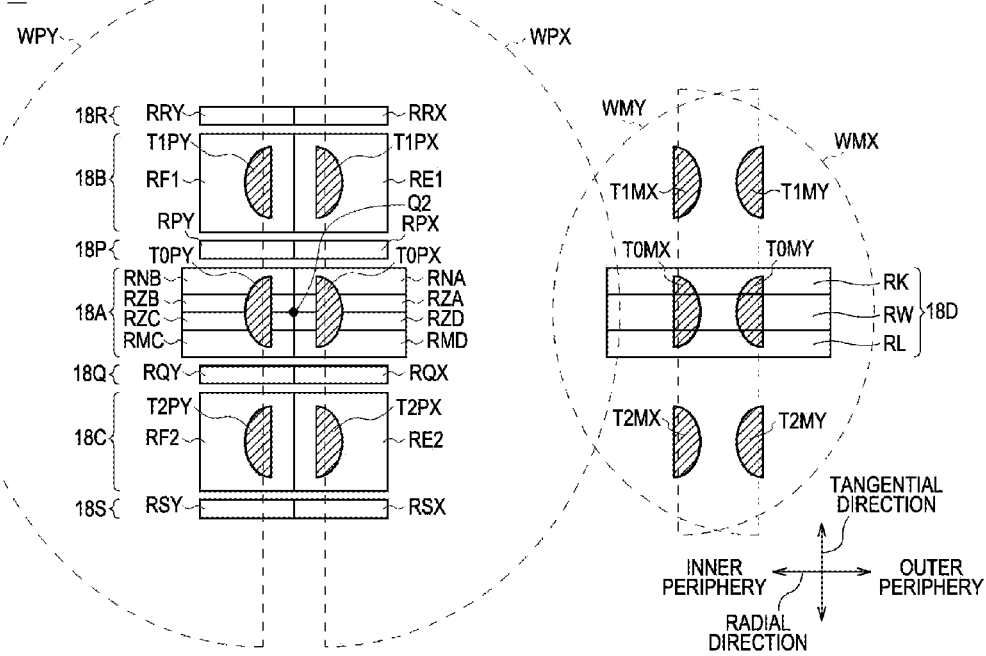
FIG. 8 is a schematic diagram illustrating the configuration of a photo-detector according to the first embodiment.

Furthermore, the signal processing section 4 calculates a focus error signal by using the SSD method. In detail, the signal processing section 4 calculates intermediate values SPD1 and SPD2 in accordance with the following equations (13) and (14) by using the light reception signals obtained from the light-receiving region groups 18A and 18D (FIG. 8).

$$SPD1 = UW + (UNA+UNB) - (UMC+UMD) \quad (13)$$

$$SPD2 = (UZA+UZB+UZC+UZD) + UK + UL \quad (14)$$

Subsequently, the signal processing section 4 calculates a focus error signal SFE in accordance with the following equation (15) on the basis of the intermediate values SPD1 and SPD2, and supplies the focus error signal SFE to the drive control section 3.

$$SFE = SPD1 - SPD2 \quad (15)$$

On the basis of the focus error signal SFE and the tracking error signal STE, the drive control section 3 controls the actuator 8A so as to move the objective lens 8, thereby performing so-called servo control in which the focal point F of the light beam L is set at a desired position.

Furthermore, on the basis of the main light reception values SA, SB, SC, and SD calculated from equations (7) to (10), the signal processing section 4 calculates a reproduction RF signal SRF in accordance with the following equation (16):

$$SRF = SA + SB + SC + SD \quad (16)$$

Subsequently, the signal processing section 4 performs predetermined demodulation and predetermined decoding on the reproduction RF signal SRF so as to reproduce the recorded information, and supplies the information to the control section 2. The control section 2 sends the reproduced information to the external device (not shown).

In this manner, when using the DPP method, the signal processing section 4 calculates the sub light reception values SE and SF by correcting the original light reception values SE0 and SF0 using the stray-light values SX and SY, and calculates the tracking error signal STE by using the sub light reception values SE and SF.

1.3.2. Change in Other-Layer Stray-Light

The track width, the track pitch dt (FIG. 4), and layer spacing dn (FIG. 2A) in the optical disc 100 are set with a certain allowable error depending on whether the optical disc 100 is of a CD type, a DVD type, or a BD type.

On the other hand, since the other-layer stray-light beam LN (FIG. 2A) has an optical path length that is different from that of the light beam L until the other-layer stray-light beam LN becomes incident on the photo-detector 18, as mentioned above, the other-layer stray-light beam LN forms the stray-light patterns W, as shown in FIG. 8.

Therefore, when the optical pickup 7 has different layer spacing dn (FIG. 2A), the size of the stray-light patterns W formed on the photo-detector 18 is also different.

For example, referring to FIG. 9B corresponding to FIG. 8, when the layer spacing dn is relatively large, the stray-light patterns W extend over a relatively wide range. The light intensity distribution in the tangential direction exhibited by the stray-light patterns WPX and WPY in FIG. 9B is a Gaussian distribution, as shown in FIG. 9A.

Figure 10A:
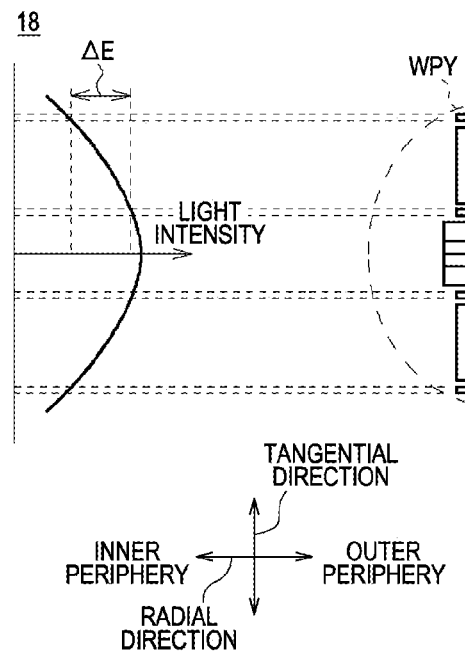
FIGS. 10A and 10B are schematic diagrams illustrating a second light-intensity distribution of stray-light patterns.
Figure 10B:
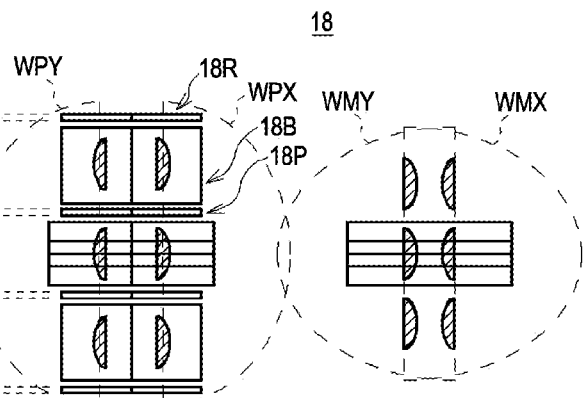

On the other hand, when the layer spacing dn is relatively small, the stray-light patterns W extend over a relatively small range, as shown in FIG. 10B corresponding to FIG. 9B. Similar to the case in FIG. 9A, the light intensity distribution in the tangential direction exhibited by the stray-light patterns WPX and WPY in FIG. 10B is a Gaussian distribution, as shown in FIG. 10A.

A distribution curve shown in FIG. 10A has a steeper angle than that of a distribution curve shown in FIG. 9A. Therefore, a difference value ΔE in the light intensity of the other-layer stray-light beam LN between the stray-light-receiving region groups 18P and 18R significantly differs between the case in FIG. 9A and the case in FIG. 10A.

Specifically, a light-intensity ratio of the stray-light patterns W between the sub light-receiving regions (light-receiving region group 18B), the inner stray-light-receiving regions (stray-light-receiving region group 18P), and the outer stray-light-receiving regions (stray-light-receiving region group 18R) is different between the case in FIG. 9B and the case in FIG. 10B.

Figure 11:
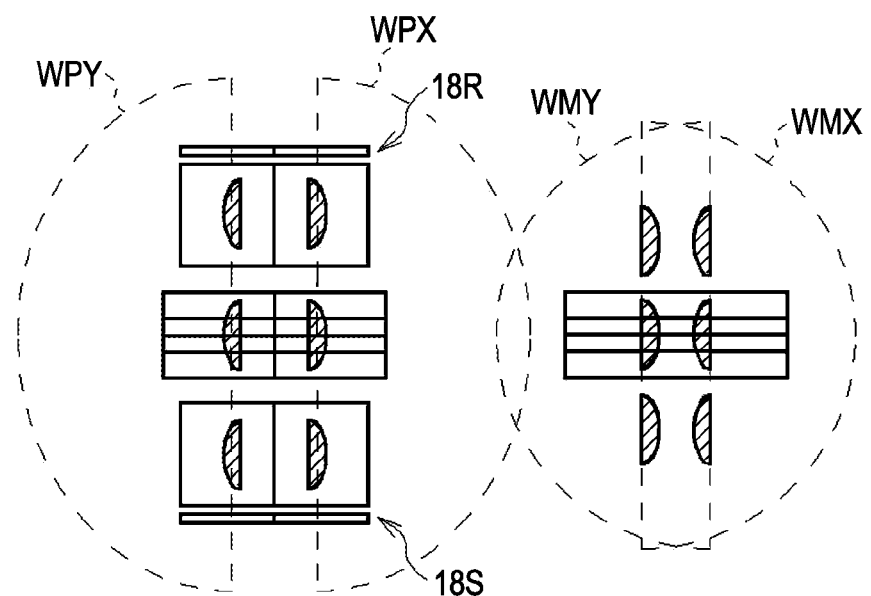
FIG. 11 is a schematic diagram illustrating the configuration of a photo-detector without inner stray-light-receiving regions.

FIG. 11 shows a hypothetical photo-detector 28 not provided with the inner stray-light-receiving regions (stray-light-receiving region groups 18P and 18Q). When this photo-detector 28 is used, the sub light reception values SE and SF are calculated by correcting the original light reception values SE0 and SF0 in accordance with equations (3) to (6) by using the stray-light reception signals URX, URY, USX, and USY obtained from the stray-light-receiving regions R of the stray-light-receiving region groups 18R and 18S.

In other words, when using the photo-detector 28, the original light reception values SE0 and SF0 are corrected by subtracting the stray-light reception signals URX, URY, USX, and USY at a fixed ratio from the original light reception values SE0 and SF0.

This means that, as shown in FIGS. 9B and 10B, when the light-intensity ratio of the stray-light patterns W emitted to the light-receiving region group 18B and the stray-light-receiving region group 18R is different depending on the layer spacing dn (FIG. 2A), it is difficult to appropriately correct the stray-light components thereof.

In contrast, the optical pickup 7 equipped with the photo-detector 18 is capable of detecting the light intensity of the stray-light patterns W for both sections relatively far from the center point Q2 and where the light intensity is low (i.e., the stray-light-receiving region groups 18R and 18S) and sections relatively close to the center point Q2 and where the light intensity is high (i.e., the stray-light-receiving region groups 18P and 18Q).

Accordingly, the signal processing section 4 adds the stray-light reception signals U together and obtains average values, as shown in equations (3) and (4), so as to appropriately calculate the stray-light components in the sub light-receiving regions located between the inner stray-light-receiving regions and the outer stray-light-receiving regions.

Therefore, even when the layer spacing dn (FIG. 2A) is different and the light-intensity distribution is thus different (FIGS. 9A and 10A), the signal processing section 4 can appropriately cancel out the stray-light components included in the original light reception values SE0 and SF0 by performing the calculations based on equations (5) and (6).

The following description will be directed to a case where the objective lens 8 is moved in the tracking direction, that is, when a so-called lens shift or field-of-view deflection occurs. Here, the direction toward the outer periphery will be defined as positive, the direction toward the inner periphery will be defined as negative, and the moving distance of the objective lens 8 in the tracking direction will be denoted as dr [mm].

Figure 12A:
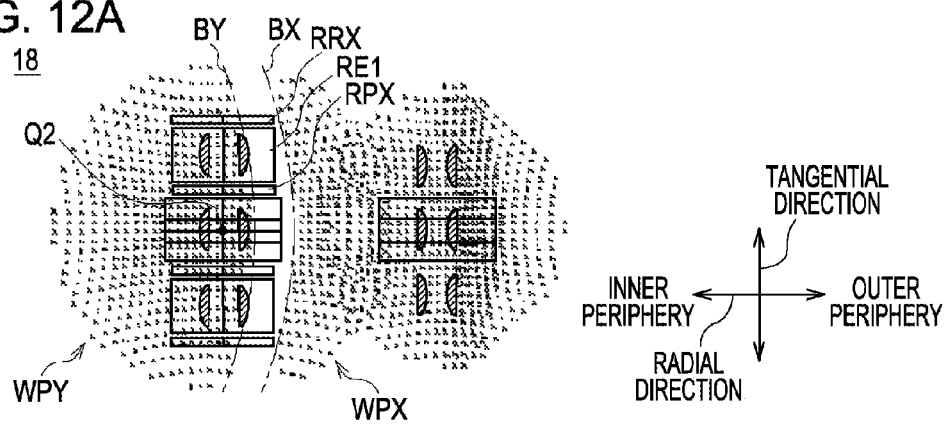
FIGS. 12A to 12C are schematic diagrams illustrating the distribution of stray-light patterns when the layer spacing is 50 µm.
Figure 12B:
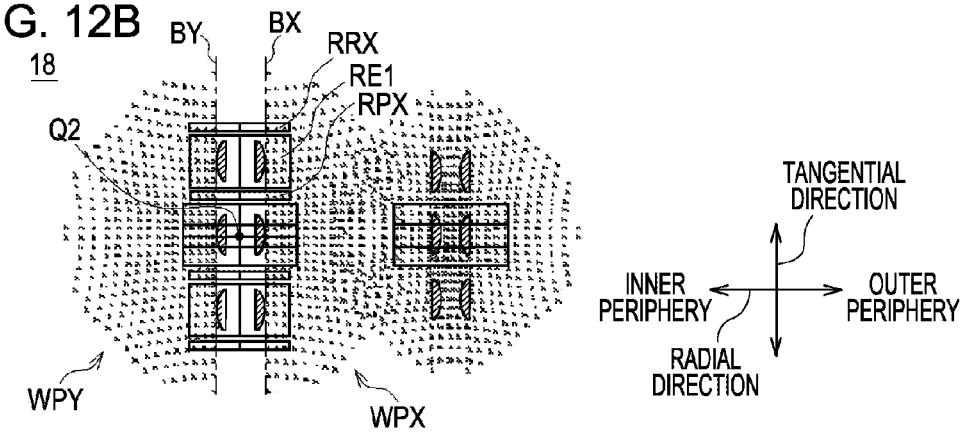
Figure 12C:
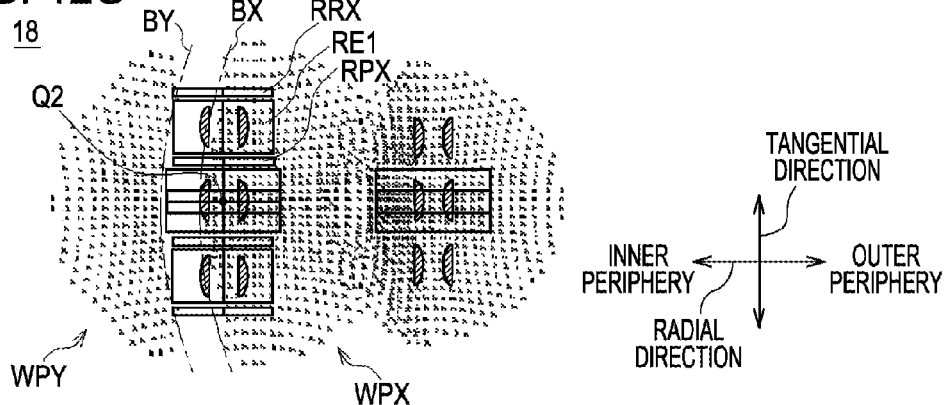

First, when the layer spacing dn (FIG. 2A) is 50 µm, stray-light patterns W as shown in FIGS. 12A, 12B, and 12C were obtained, which illustrate simulation results obtained in cases where the moving distance dr is −0.1 mm, 0 mm, and +0.1 mm, respectively.

When the moving distance dr is equal to 0 mm (FIG. 12B), a boundary line BX at the inner peripheral side of the stray-light pattern WPX and a boundary line BY at the outer peripheral side of the stray-light pattern WPY both extend substantially linearly in the tangential direction.

In this case, the ratio of the areas that receive the stray-light patterns W in the light-receiving regions and the stray-light-receiving regions is substantially fixed. This is apparent from that the stray-light values SX and SY calculated using equations (3) and (4) have a fixed ratio with respect to the stray-light components included in the original light reception values SE0 and SF0. Therefore, the signal processing section 4 can appropriately correct the stray-light components in the stray-light patterns W in accordance with equations (5) and (6).

On the other hand, when the moving distance dr is equal to −0.1 mm (FIG. 12A), the boundary lines BX and BY are both curved toward the outer periphery.

When focusing on, for example, the stray-light-receiving region RPX, the light-receiving region RE1, and the stray-light-receiving region RRX as an inner stray-light-receiving region, a sub light-receiving region, and an outer stray-light-receiving region, respectively, the areas thereof that receive the stray-light patterns W do not have a fixed ratio and gradually decrease with increasing distance in the tangential direction from the center point Q2.

This is apparent from that the stray-light values SX and SY calculated using equations (3) and (4) have a fixed ratio with respect to the stray-light components included in the original light reception values SE0 and SF0. Therefore, the signal processing section 4 can appropriately correct the stray-light components in the stray-light patterns W in accordance with equations (5) and (6).

On the other hand, when the moving distance dr is equal to +0.1 mm (FIG. 12C), the boundary lines BX and BY are both curved toward the inner periphery. In this case, the stray-light patterns W are substantially symmetrical, in the radial direction, to those in the case where the moving distance dr is equal to −0.1 mm (FIG. 12A). Therefore, the signal processing section 4 can appropriately correct the stray-light components in the stray-light patterns W in accordance with equations (5) and (6).

Figure 13A:
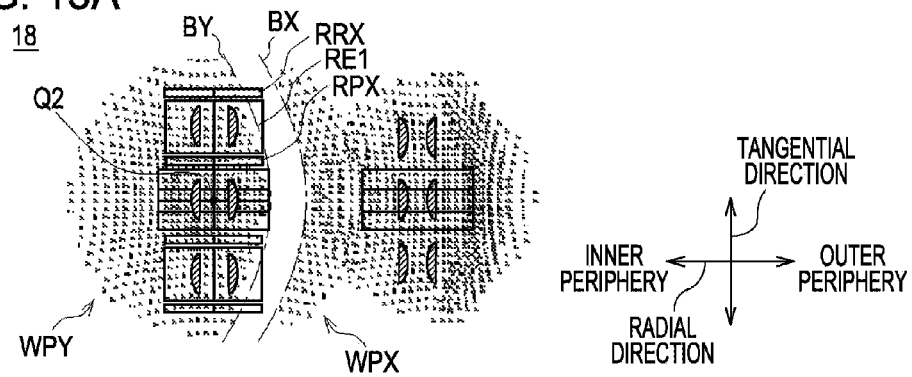
FIGS. 13A to 13C are schematic diagrams illustrating the distribution of stray-light patterns when the layer spacing is 45 µm.
Figure 13B:
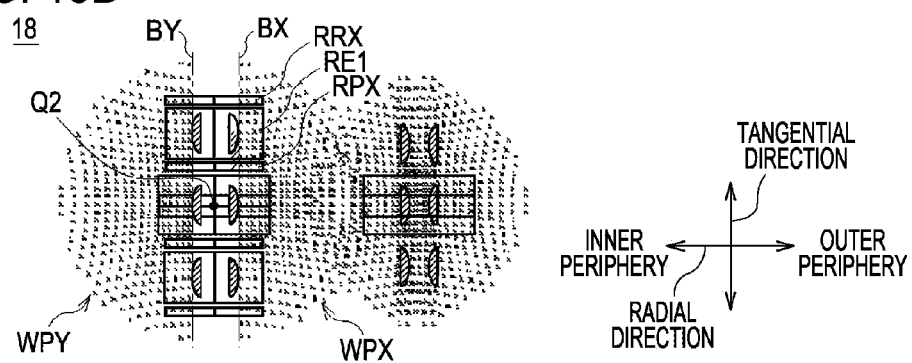
Figure 13C:
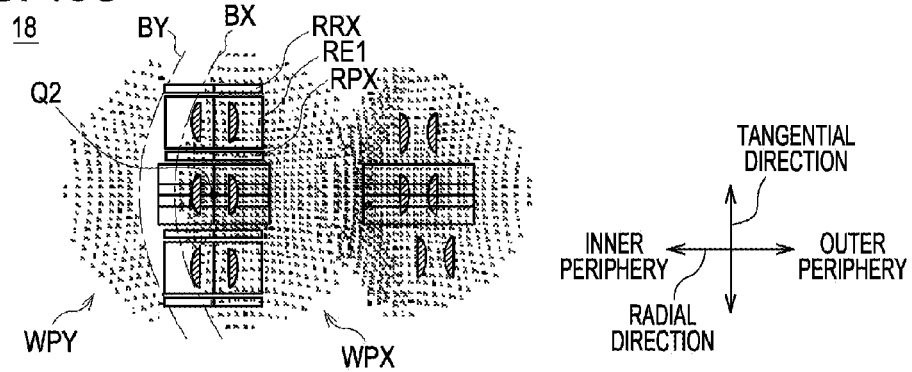

Next, when the layer spacing do (FIG. 2A) is 45 µm, stray-light patterns W as shown in FIGS. 13A, 13B, and 13C were obtained, which illustrate simulation results obtained in cases where the moving distance dr is −0.1 mm, 0 mm, and +0.1 mm, respectively.

Similar to the above, the boundary lines BX and BY are linear when the moving distance dr is equal to 0 mm, are curved toward the outer periphery when the moving distance dr is equal to −0.1 mm, and are curved toward the inner periphery when the moving distance dr is equal to +0.1 mm. However, in comparison to FIGS. 12A to 12C, the degree of curvature is greater.

When focusing on the stray-light-receiving region RPX, the light-receiving region RE1, and the stray-light-receiving region RRX as an inner stray-light-receiving region, a sub light-receiving region, and an outer stray-light-receiving region, respectively, in FIG. 13A, the areas thereof that receive the stray-light patterns W gradually decrease with increasing distance in the tangential direction from the center point Q2, as in the case in FIG. 12A.

Consequently, the stray-light values SX and SY calculated using equations (3) and (4) have a fixed ratio with respect to the stray-light components included in the original light reception values SE0 and SF0. Therefore, the signal processing section 4 can appropriately correct the stray-light components in the stray-light patterns W in accordance with equations (5) and (6). The same applies to the case in FIG. 13C.

Accordingly, even when the layer spacing do changes or a lens shift of the objective lens 8 occurs, the optical disc apparatus 1 can appropriately correct the stray-light components included in the original light reception values SE0 and SF0 by performing calculations based on equations (3) to (6).

1.4. Operation and Advantages

In the above configuration, the photo-detector 18 is provided with the stray-light-receiving region groups 18P and 18Q as inner stray-light-receiving regions between the light-receiving region groups 18A and 18B and between the light-receiving region groups 18A and 18C, respectively. Moreover, the photo-detector 18 is provided with the stray-light-receiving region groups 18R and 18S as outer stray-light-receiving regions opposite the stray-light-receiving region groups 18P and 18Q with the light-receiving region groups 18B and 18C therebetween, respectively (FIG. 8).

The optical pickup 7 of the optical disc apparatus 1 focuses the light beam L onto the target recording layer YT of the optical disc 100 (FIG. 2A) and makes the reflected light beam LR, which is obtained by reflecting the light beam L at the target recording layer YT, incident on the hologram plate 17.

The hologram plate 17 diffracts the reflected light beam LR in the regions 17X and 17Y so as to separate the reflected light beam LR into the positive reflected light beams LRPX and LRPY and the negative reflected light beams LRMX and LRMY, and emits these reflected light beams toward the photo-detector 18 without rotating the images thereof.

The hologram plate 17 makes the focal points FP of the positive reflected light beams LRPX and LRPY different from the focal points FM of the negative reflected light beams LRMX and LRMY (FIG. 7).

In the photo-detector 18, the light-receiving regions R of the light-receiving region groups 18A, 18B, and 18C optically receive the main beam and the two sub beams of each positive reflected light beam LR, generate the light reception signals U in accordance with the amount of received light, and supply these signals to the signal processing section 4.

Furthermore, in the photo-detector 18, the stray-light-receiving regions R of the stray-light-receiving region groups 18P, 18Q, 18R, and 18S optically receive the stray-light patterns W, generate the stray-light reception signals U in accordance with the amount of received light, and supply these signals to the signal processing section 4.

When generating a tracking error signal using the DPP method, the signal processing section 4 calculates the original light reception values SE0 and SF0 in accordance with equations (1) and (2), calculates the stray-light values SX and SY in accordance with equations (3) and (4), and calculates the sub light reception values SE and SF in accordance with equations (5) and (6).

Furthermore, the signal processing section 4 calculates the tracking error signal STE in accordance with equation (12) on the basis of the main light reception values SA to SD and the sub light reception values SE and SF calculated using equations (7) to (10).

Moreover, the signal processing section 4 calculates the intermediate values SPD1 and SPD2 in accordance with equations (13) and (14) and calculates the focus error signal SFE in accordance with equation (15). Furthermore, the signal processing section 4 calculates the reproduction RF signal SRF in accordance with equation (16).

Accordingly, since the optical disc apparatus 1 can appropriately cancel out the stray-light components from the original light reception values SE0 and SF0 by using the signal processing section 4, the sub light reception values SE and SF corresponding to the light amount of the sub beams of the reflected light beam LR can be calculated, whereby a high quality tracking error signal STE can be calculated. In consequence, the optical disc apparatus 1 can perform highly accurate tracking control on the basis of this tracking error signal STE by using the drive control section 3.

In this case, the stray-light patterns W incident on the photo-detector 18 change in various forms (FIGS. 9A, 9B, 10A, 10B, 12A to 12C, and 13A to 13C) due to different layer spacing do (FIG. 2A) in the optical disc 100 or a lens shift of the objective lens 8. Therefore, the light-intensity ratio of the incident stray-light patterns W between the inner stray-light-receiving regions, and the sub light-receiving regions, and the outer stray-light-receiving regions changes to various values.

On the other hand, in the photo-detector 18, the inner stray-light-receiving regions (stray-light-receiving region groups 18P and 18Q) disposed on the inner side, which is the side closer to the center point Q2, relative to the sub light-receiving regions (light-receiving region groups 18B and 18C) and the outer stray-light-receiving regions (stray-light-receiving region groups 18R and 18S) disposed on the outer side, which is the opposite side of the respective inner stray-light-receiving regions, optically receive the stray-light patterns W.

In particular, the optical pickup 7 is a non-rotational optical system. Therefore, the light intensity of the stray-light patterns W substantially exhibits a Gaussian distribution (FIGS. 9A and 10A) in which the light intensity is at maximum near the center point Q2 and decreases monotonously with increasing distance from the center point Q2.

In the hologram plate 17, the dividing line between the regions 17X and 17Y that extends in the tangential direction separates the reflected light beam LR into two beam components in the radial direction (FIG. 5). Therefore, even when the boundary lines BX and BY of the stray-light patterns W curve toward the inner periphery or the outer periphery due to a lens shift of the objective lens 8 (FIG. 12A or 12C, and FIG. 13A or 13C), the boundary lines BX and BY extend substantially linearly across the inner stray-light-receiving regions, the sub light-receiving regions, and the outer stray-light-receiving regions.

Consequently, for example, a value obtained by adding the stray-light reception signals in the inner stray-light-receiving regions and the outer stray-light-receiving regions has a proportional relationship with the stray-light components included in the light reception signals in the sub light-receiving regions located therebetween.

Specifically, the signal processing section 4 adds the stray-light reception signals U together, as in equations (3) and (4), and obtains average values so as to calculate the stray-light values SX and SY having a substantially proportional relationship with the stray-light components included in the original light reception values SE0 and SF0. Thus, the signal processing section 4 multiplies the stray-light values SX and SY by a predetermined coefficient α in equations (5) and (6) and subtracts the products from the original light reception values SE0 and SF0 so as to correct the stray-light components of the original light reception values SE0 and SF0 with extremely high accuracy.

Figure 14:
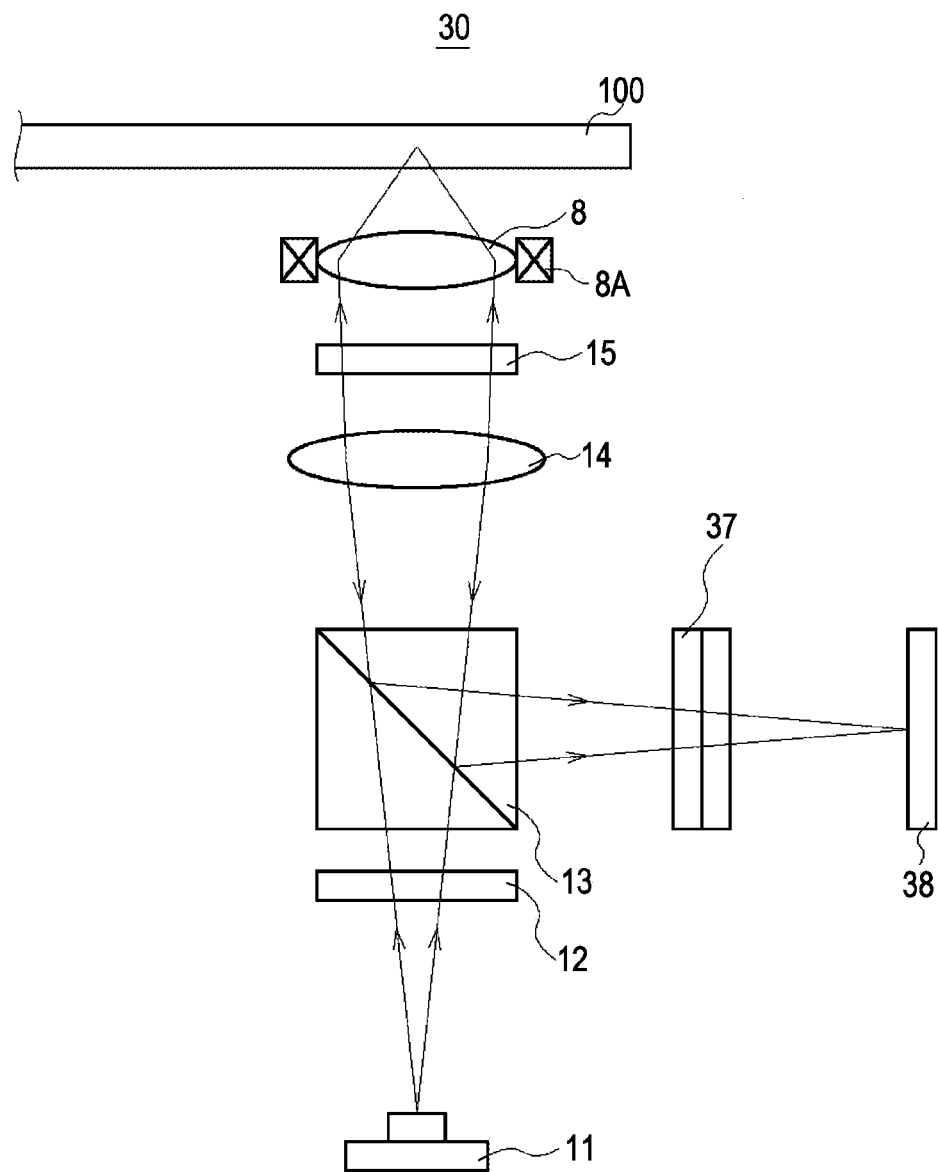
FIG. 14 is a schematic diagram illustrating the configuration of an optical pickup that corresponds to an astigmatism method.

As mentioned above, an astigmatism method is widely used as a method of generating a focus error signal. As a comparison with the optical pickup 7, an optical pickup 30 corresponding to an astigmatism method will be described with reference to FIG. 14 that corresponds to FIG. 3. In other words, the optical pickup 30 is a rotational optical system.

The optical pickup 30 differs from the optical pickup 7 (FIG. 3) in being provided with a multi-lens 37 in place of the lens 16 and the hologram plate 17 and also provided with a photo-detector 38 in place of the photo-detector 18, but has a similar configuration to that of the optical pickup 7 in other sections.

The multi-lens 37 gives astigmatism to the reflected light beam LR and emits the reflected light beam LR to the photo-detector 38. The photo-detector 38 includes a plurality of light-receiving region groups 38A, 38B, and 38C, as shown in FIG. 15 that corresponds to FIG. 8.

Regarding spots T0, T1, and T2 formed by the reflected light beam LR, the images thereof are rotated by about 90° due to the effect of the multi-lens 37, as compared with those in the optical pickup 7. Specifically, in each of the spots T0, T1, and T2, the push-pull regions are distributed separately in the tangential direction.

Figure 2B:
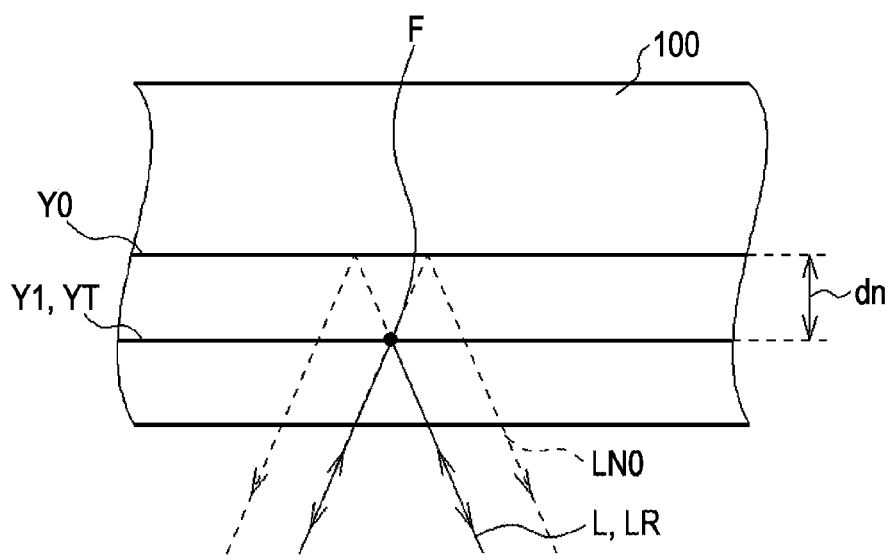
Figure 16A:
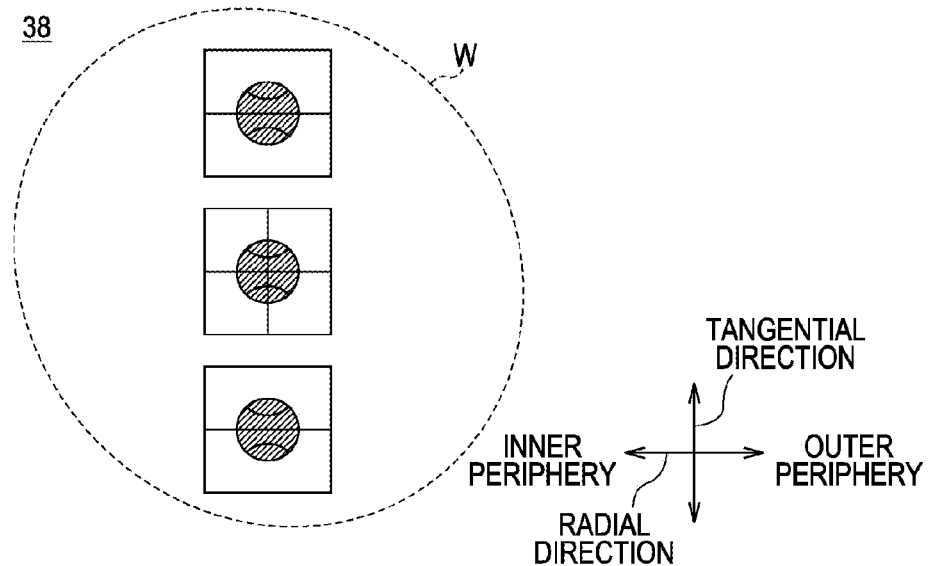
FIGS. 16A and 16B are schematic diagrams illustrating how stray-light patterns are formed in the optical pickup that corresponds to the astigmatism method.
Figure 16B:
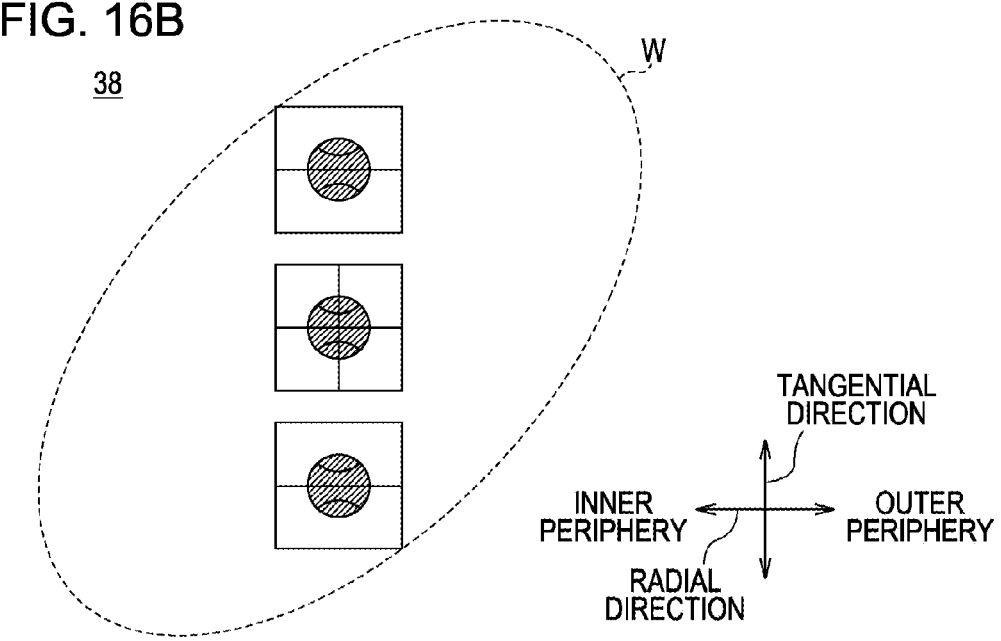

If the recording layer Y0 of the optical disc 100 is the target recording layer (FIG. 2A), a stray-light pattern W as shown in FIG. 16A is formed on the photo-detector 38. On the other hand, when the recording layer Y1 of the optical disc 100 is the target recording layer, as shown in FIG. 2B, a stray-light pattern W as shown in FIG. 16B is formed on the photo-detector 38.

Specifically, in the case of a rotational optical system that uses the astigmatism method, the shape of the stray-light pattern W greatly varies depending on the target recording layer YT, and the light-intensity distribution also varies. Therefore, providing the photo-detector 38 with the same stray-light-receiving region groups as those in the photo-detector 18 does not necessarily mean that the values of the stray-light reception signals U in the stray-light-receiving region groups will have a proportional relationship with the stray-light components included in the light reception signals U in the light-receiving region groups 38B and 38C. In consequence, even if the signal processing section 4 performs calculations based on equations (3) to (6), it is extremely difficult to cancel out the stray-light components included in the original light reception values SE0 and SF0.

In contrast, the optical disc apparatus 1, which includes a non-rotational optical system, generates the focus error signal SFE by the SSD method instead of using the astigmatism method. Specifically, since the optical pickup 7 does not use a multi-lens or an expander lens to give astigmatism to the reflected light beam LR, the optical pickup 7 can emit the reflected light beam LR to the photo-detector 18 without distorting or rotating the image thereof.

As a result, regarding the light-intensity distribution of each stray-light pattern W in the optical pickup 7, the Gaussian distribution is prevented from being distorted by a large degree (FIGS. 9A and 10A). Thus, the signal processing section 4 can utilize the stray-light reception signals U to appropriately cancel out the stray-light components included in the original light reception values SE0 and SF0.

Furthermore, with the hologram plate 17 in the optical pickup 7, the push-pull regions PPX and PPY (FIG. 5) can be divided in the radial direction and be emitted onto the photo-detector 18 (FIG. 8).

In addition, in the SSD method, it is sufficient so long as the size of the beam spots in the tangential direction can be detected. Therefore, in the photo-detector 18, the necessity of limiting the detection range of each beam spot is reduced, whereby each light receiving region can be made long in the radial direction.

Accordingly, in the optical pickup 7, even if the incident position of the reflected light beam LR is slightly deviated in the radial direction (i.e., the horizontal direction in FIG. 8), the main light reception signal SA or the like generated on the basis of each light reception signal U can be generated with high accuracy. From another viewpoint, regarding the optical pickup 7, the positional accuracy of each optical component in the radial direction does not necessarily have to be increased, thereby simplifying the assembly process and the adjustment process.

According to the above configuration, the optical disc apparatus 1 uses the hologram plate 17 to separate the reflected light beam LR into multiple beam components without rotating the images thereof, and emits the beam components to the photo-detector 18 provided with the stray-light-receiving region groups 18P and 18Q on the center point Q2 side of the light-receiving region groups 18B and 18C, respectively, and also provided with the stray-light-receiving region groups 18R and 18S on the side opposite the stray-light-receiving region groups 18P and 18Q with the light-receiving region groups 18B and 18C therebetween, respectively. The signal processing section 4 corrects each light reception signal U generated by the corresponding light-receiving region R on the basis of the two sub beams of the positive reflected light beam LR by using a sum value of the stray-light reception signals U generated by the individual stray-light-receiving regions R on the basis of the stray-light patterns W. Thus, the optical disc apparatus 1 cancels out the stray-light components so as to calculate the sub light reception values SE and SF corresponding to the light amount of the sub beams of the reflected light beam LR, whereby a high quality tracking error signal STE can be calculated.

2. Second Embodiment 2.1. Configuration of Optical Disc Apparatus and Optical Pickup A second embodiment differs from the first embodiment in that a Foucault method is used as a method of generating the focus error signal SFE in place of the SSD method.

An optical disc apparatus 50 (FIG. 1) according to the second embodiment differs from the optical disc apparatus 1 in being provided with a signal processing section 54 and an optical pickup 57 in place of the signal processing section 4 and the optical pickup 7, but has a similar configuration to that of the optical disc apparatus 1 in other sections.

Figure 17:
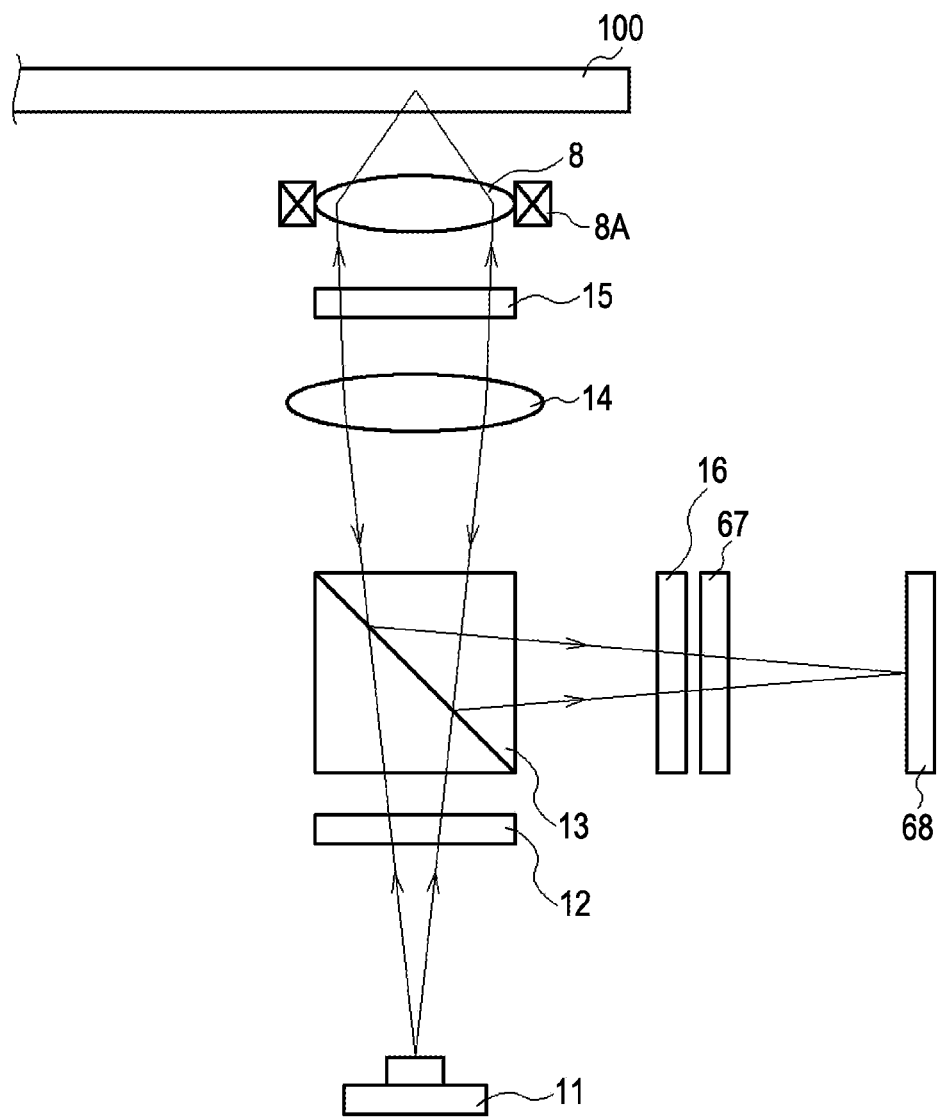
FIG. 17 is a schematic diagram illustrating the configuration of an optical pickup according to a second embodiment.

Referring to FIG. 17 in which components corresponding to those in FIG. 3 are given the same reference numerals, the optical pickup 57 differs from the optical pickup 7 in being provided with a hologram plate 67 and a photo-detector 68 in place of the hologram plate 17 and the photo-detector 18, but has a similar configuration to that of the optical pickup 7 in other sections.

Referring to FIG. 18 that corresponds to FIG. 5, the hologram plate 67 differs from that in the first embodiment in being divided into a plurality of regions 67X, 67Y, and 67Z due to a dividing pattern corresponding to the Foucault method.

The regions 67X, 67Y, and 67Z are each provided with a blazed hologram and configured to diffract an incident portion of the reflected light beam LR in one direction.

Referring to FIGS. 18 and 19, the region 67Z is configured to diffract a reflected light beam LRZ, which is an incident portion of the reflected light beam LR, toward the outer periphery. On the other hand, the regions 67X and 67Y are configured to respectively diffract reflected light beams LRX and LRY, which are incident portions of the reflected light beam LR, toward the inner periphery.

Furthermore, the hologram in the region 67Y is designed such that the diffraction angle thereof is larger than that of the region 67X, or in other words, such that the reflected light beam LRY is made to travel away from the reflected light beam LRX in the radial direction.

Referring to FIG. 20 that corresponds to FIG. 8, the photo-detector 68 in its entirety is capable of generating a light reception signal used for generating a focus error signal by the Foucault method and also capable of generating a light reception signal used for generating a tracking error signal by the DPP method.

Light-receiving regions R in light-receiving region groups 68A, 68B, and 68C of the photo-detector 68 are each configured to optically receive the main beam and the two sub beams of the corresponding one of the reflected light beams LRX and LRY (FIG. 19).

Specifically, the light-receiving regions R of the light-receiving region groups 68A, 68B, 68C have the same configuration as that of the light-receiving regions R of the light-receiving region groups 18A, 18B, and 18C (FIG. 8) except that the number into which the light-receiving region group 68A is divided in the tangential direction is reduced from four to two.

In detail, the light-receiving region group 68A serving as main light-receiving regions is entirely divided into four grid-like regions so as to be provided with light-receiving regions RA, RB, RC, and RD. The light-receiving regions RA, RB, RC, and RD are equivalent to a configuration formed by combining the light-receiving regions RNA and RZA, the light-receiving regions RNB and RZB, the light-receiving regions RMC and RZC, and the light-receiving regions RMD and RND, respectively, in the photo-detector 18.

The light-receiving regions RA, RB, RC, and RD respectively generate light reception signals UA, UB, UC, and UD in accordance with the amount of received light, and supply these signals to the signal processing section 54 (FIG. 1).

The light-receiving region group 68B serving as sub light-receiving regions is similar to the light-receiving region group 18B (FIG. 8) in being divided into the outer-peripheral light-receiving region RE1 and the inner-peripheral light-receiving region RF1. Furthermore, the light-receiving region group 68C serving as sub light-receiving regions is similar to the light-receiving region group 18C (FIG. 8) in being divided into the outer-peripheral light-receiving region RE2 and the inner-peripheral light-receiving region RF2.

The light-receiving regions RE1, RF1, RE2, and RF2 respectively generate light reception signals UE1, UF1, UE2, and UF2 in accordance with the amount of received light, and supply these signals to the signal processing section 54 (FIG. 1).

The photo-detector 68 is also provided with a light-receiving region group 68D that corresponds to the light-receiving region group 18D and that is configured to optically receive the reflected light beam LRZ. The light-receiving region group 68D is divided into two regions in the tangential direction so as to have light-receiving regions RK and RL. The light-receiving regions RK and RL respectively generate light reception signals UK and UL in accordance with the amount of received light, and supply these signals to the signal processing section 54 (FIG. 1).

On the photo-detector 68, stray-light patterns WX, WY, and WZ are formed in accordance with the dividing pattern in the hologram plate 67.

The photo-detector 68 is provided with stray-light-receiving region groups 68P, 68Q, 68R, and 68S that respectively correspond to the stray-light-receiving region groups 18P, 18Q, 18R, and 18S (FIG. 8).

The stray-light-receiving region groups 68P and 68Q serving as inner stray-light-receiving regions are similar to the stray-light-receiving region groups 18P and 18Q in being provided with the stray-light-receiving regions RPX and RPY and the stray-light-receiving regions RQX and RQY, respectively.

The stray-light-receiving region groups 68R and 68S serving as outer stray-light-receiving regions are similar to the stray-light-receiving region groups 18R and 18S in being provided with the stray-light-receiving regions RRX and RRY and the stray-light-receiving regions RSX and RSY, respectively.

The stray-light-receiving regions RPX, RPY, RQX, RQY, RRX, RRY, RSX, and RSY respectively generate light reception signals UPX, UPY, UQX, UQY, URX, URY, USX, and USY in accordance with the amount of received light, and supply these signals to the signal processing section 54 (FIG. 1).

2.2. Generation of Various Signals

As in the first embodiment, the signal processing section 54 calculates the original light reception values SE0 and SF0 in accordance with equations (1) and (2) and calculates the stray-light values SX and SY in accordance with equations (3) and (4).

Moreover, the signal processing section 54 corrects the original light reception values SE0 and SF0 in accordance with equations (5) and (6) by using the stray-light values SX and SY and the predetermined coefficient α, so as to calculate the sub light reception values SE and SF.

Like the optical pickup 7, the optical pickup 57 is a non-rotational optical system. Therefore, as in the first embodiment, the signal processing section 54 can appropriately cancel out the stray-light components included in the original light reception values SE0 and SF0.

When generating a tracking error signal by the DPP method, the signal processing section 54 generates the tracking error signal STE in accordance with the following equation (17) in place of equation (12).

$$STE=\{(UA+UD)-(UB+UC)\}-k\cdot(SE-SF) \quad (17)$$

Furthermore, on the basis of the light reception signals UA, UB, UC, and UD as well as the light reception signals UK and UL, the signal processing section 54 generates the focus error signal SFE by performing a predetermined calculation based on the Foucault method.

Accordingly, as in the first embodiment, the drive control section 3 (FIG. 1) is configured to perform focus control on the basis of the focus error signal SFE and tracking control on the basis of the tracking error signal STE.

2.3. Operation and Advantages

In the above configuration, the photo-detector 68 is provided with the stray-light-receiving region groups 68P and 68Q as inner stray-light-receiving regions between the light-receiving region groups 68A and 68B and between the light-receiving region groups 68A and 68C, respectively. Moreover, the photo-detector 68 is provided with the stray-light-receiving region groups 68R and 68S as outer stray-light-receiving regions opposite the stray-light-receiving region groups 68P and 68Q with the light-receiving region groups 68B and 68C therebetween, respectively (FIG. 20).

The optical pickup 57 of the optical disc apparatus 50 makes the reflected light beam LR incident on the hologram plate 67. The hologram plate 67 diffracts the reflected light beam LR in the regions 67X, 67Y, and 67Z so as to separate the main beam and the two sub beams thereof into the reflected light beams LRX, LRY, and LRZ.

In the photo-detector 68, the light-receiving regions R of the light-receiving region groups 68A, 68B, and 68C optically receive the reflected light beams LRX and LRY corresponding to the main beam and the two sub beams, generate the light reception signals U in accordance with the amount of received light, and supply the signals to the signal processing section 54.

Furthermore, in the photo-detector 68, the stray-light-receiving regions R of the stray-light-receiving region groups 68P, 68Q, 68R, and 68S optically receive the stray-light patterns W, generate the stray-light reception signals U in accordance with the amount of received light, and supply these signals to the signal processing section 54.

The signal processing section 54 calculates the original light reception values SE0 and SF0 in accordance with equations (1) and (2), calculates the stray-light values SX and SY in accordance with equations (3) and (4), and calculates the sub light reception values SE and SF in accordance with equations (5) and (6).

Furthermore, the signal processing section 54 calculates the tracking error signal STE in accordance with equation (17) on the basis of the light reception signals UA to UD and the sub light reception values SE and SF. Moreover, the signal processing section 54 calculates the focus error signal SFE in accordance with the Foucault method.

Therefore, as in the first embodiment, since the optical disc apparatus 50 can appropriately cancel out the stray-light components from the original light reception values SE0 and SF0, the sub light reception values SE and SF corresponding to the light amount of the sub beams of the reflected light beams LRX and LRY can be calculated, whereby a high quality tracking error signal STE can be calculated. In consequence, the optical disc apparatus 50 can perform highly accurate tracking control on the basis of this tracking error signal STE by using the drive control section 3.

In particular, the optical disc apparatus 50 is similar to the optical disc apparatus 1 according to the first embodiment that uses the SSD method in that the optical disc apparatus 50 generates a focus error signal by using the Foucault method and does not rotate the image of the reflected light beam LR to be emitted to the photo-detector 68.

Therefore, as in the first embodiment, the signal processing section 54 adds the stray-light reception signals U together and obtains average values so as to calculate the stray-light values SX and SY having a substantially proportional relationship with the stray-light components included in the original light reception values SE0 and SF0. Consequently, by performing calculations based on equations (5) and (6), the signal processing section 54 can correct the stray-light components of the original light reception values SE0 and SF0 with extremely high accuracy.

The optical disc apparatus 50 can achieve advantages similar to those of the first embodiment with regard to other points.

According to the above configuration, the optical disc apparatus 50 uses the hologram plate 67 to separate the reflected light beam LR into multiple beam components without rotating the images thereof, and emits the beam components to the photo-detector 68 provided with the stray-light-receiving region groups 68P and 68Q on the center point Q2 side of the light-receiving region groups 68B and 68C, respectively, and also provided with the stray-light-receiving region groups 68R and 68S on the side opposite the stray-light-receiving region groups 68P and 68Q with the light-receiving region groups 68B and 68C therebetween, respectively. The signal processing section 54 corrects each light reception signal U generated by the corresponding light-receiving region R on the basis of the two sub beams of the reflected light beams LRX and LRY by using a sum value of the stray-light reception signals U generated by the individual stray-light-receiving regions R on the basis of the stray-light patterns W. Thus, the optical disc apparatus 50 cancels out the stray-light components so as to calculate the sub light reception values SE and SF corresponding to the light amount of the sub beams of the reflected light beams LRX and LRY, whereby a high quality tracking error signal STE can be calculated.

3. Third Embodiment

3.1. Configuration of Optical Disc Apparatus and Optical Pickup

An optical disc apparatus 70 (FIG. 1) according to a third embodiment differs from the optical disc apparatus 1 according to the first embodiment in being provided with an optical pickup 77 in place of the optical pickup 7, but has a similar configuration to that of the optical disc apparatus 1 in other sections.

Figure 21:
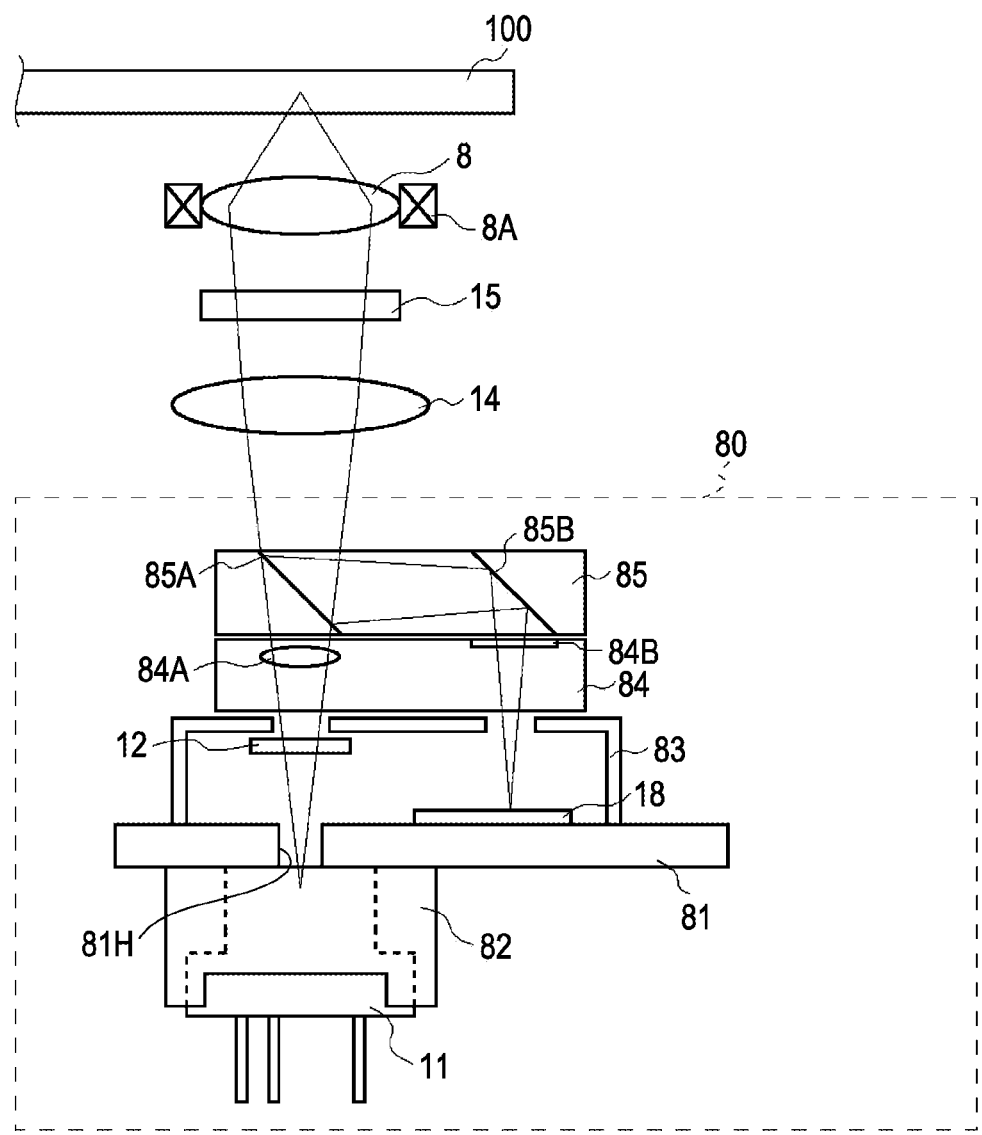
FIG. 21 is a schematic diagram illustrating the configuration of an optical pickup according to a third embodiment.

Referring to FIG. 21 in which components corresponding to those in FIG. 3 are given the same reference numerals, the optical pickup 77 significantly differs from the optical pickup 7 in being provided with an optical integrated unit 80 formed by combining the multiple optical components in the optical pickup 7.

The optical integrated unit 80 is formed by attaching a lens holder 82 to one surface of a plate-like substrate 81 and stacking a spacer 83, a compound lens 84, and a multilayer prism 85 in that order on a surface of the substrate 81 opposite the aforementioned one surface.

The lens holder 82 is configured to fix the laser diode 11 on the substrate 81. The laser diode 11 emits the light beam L under the control of the control section 2 (FIG. 1), and allows the light beam L to travel toward the opposite side of the substrate 81 via a hole 81H provided in the substrate 81.

The spacer 83 has a space formed in the interior thereof and has the grating 12 attached thereto. As in the first embodiment, the grating 12 separates the light beam L into a main beam and two sub beams.

The compound lens 84 is provided with a coupling lens 84A and a hologram 84B. The coupling lens 84A converts the divergence angle of the light beam L and allows the light beam L to enter the multilayer prism 85.

The multilayer prism 85 is provided with a polarizing surface 85A, having the same function as that of the polarizing surface 13S of the polarizing beam splitter 13, and a mirror surface 85B. The polarizing surface 85A transmits the light beam L, which is made of p-polarized light, and allows the light beam L to be incident on the collimator lens 14.

Subsequently, similar to the optical pickup 7 (FIG. 3), the optical pickup 77 gives an appropriate optical effect to the light beam L via the collimator lens 14, the quarter-wave plate 15, and the objective lens 8 and emits the light beam L to the optical disc 100. The light beam L is reflected at the target recording layer YT (FIG. 2A) of the optical disc 100, thereby generating a reflected light beam LR.

Like the optical pickup 7, the optical pickup 77 gives a predetermined optical effect to the reflected light beam LR via the objective lens 8, the quarter-wave plate 15, and the collimator lens 14 and allows the reflected light beam LR to enter the multilayer prism 85 in the optical integrated unit 80.

The multilayer prism 85 sequentially reflects the reflected light beam LR, which is made of s-polarized light, at the polarizing surface 85A and the mirror surface 85B and makes the reflected light beam LR incident on the hologram 84B of the compound lens 84.

The hologram 84B has optical properties similar to those of the hologram plate 17 in the first embodiment, such that the hologram 84B separates the reflected light beam LR into a plurality of reflected light beams LRPX, LRPY, LRMX, and LRMY (FIG. 6) and emits these reflected light beams toward the photo-detector 18 without rotating the images thereof.

The photo-detector 18 is attached to a surface of the substrate 81 within the space in the spacer 83 and is provided with a plurality of light-receiving regions R and stray-light-receiving regions R (FIG. 8), as in the first embodiment.

Specifically, the photo-detector 18 is provided with the stray-light-receiving region groups 18P and 18Q between the light-receiving region groups 18A and 18B and between the light-receiving region groups 18A and 18C, respectively, and also provided with the stray-light-receiving region groups 18R and 18S opposite the stray-light-receiving region groups 18P and 18Q with the light-receiving region groups 18B and 18C therebetween, respectively.

As in the first embodiment, the photo-detector 18 generates light reception signals U and stray-light reception signals U and supplies the signals to the signal processing section 4.

Similar to the first embodiment, when generating a tracking error signal using the DPP method, the signal processing section 4 calculates the original light reception values SE0 and SF0 in accordance with equations (1) and (2) and calculates the stray-light values SX and SY in accordance with equations (3) and (4).

Moreover, the signal processing section 4 calculates the sub light reception values SE and SF by correcting the original light reception values SE0 and SF0 using the stray-light values SX and SY and the predetermined coefficient α in accordance with equations (5) and (6).

Furthermore, the signal processing section 4 calculates the main light reception values SA, SB, SC, and SD in accordance with equations (7) to (10) and calculates the tracking error signal STE in accordance with equation (12).

In addition, as in the first embodiment, the signal processing section 4 performs calculations based on equations (13) to (15) in accordance with the SSD method so as to calculate the focus error signal SFE.

Accordingly, despite the fact that the optical disc apparatus 70 according to the third embodiment includes the optical integrated unit 80 in the optical pickup 77, the optical disc apparatus 70 is configured to correct the stray-light components and generate the tracking error signal STE in a similar manner to the first embodiment.

3.2. Operation and Advantages

In the above configuration, the photo-detector 18 is provided with the stray-light-receiving region groups 18P and 18Q as inner stray-light-receiving regions and the stray-lightreceiving region groups 18R and 18S as outer stray-light-receiving regions, as in the first embodiment (FIG. 8).

The optical pickup 77 of the optical disc apparatus 70 makes the reflected light beam LR incident on the hologram 84B and separates the reflected light beam LR into multiple beam components without rotating the images thereof. In the photo-detector 18, the light-receiving regions R of the light-receiving region groups 18A, 18B, and 18C optically receive the reflected light beams LR, generate light reception signals U in accordance with the amount of received light, and supply the signals to the signal processing section 4.

Moreover, in the photo-detector 18, the stray-light-receiving regions R of the stray-light-receiving region groups 18P, 18Q, 18R, and 18S optically receive the stray-light patterns W, generate stray-light reception signals U in accordance with the amount of received light, and supplies these signals to the signal processing section 4.

When generating a tracking error signal using the DPP method, the signal processing section 4 calculates the original light reception values SE0 and SF0 in accordance with equations (1) and (2), calculates the stray-light values SX and SY in accordance with equations (3) and (4), and calculates the sub light reception values SE and SF in accordance with equations (5) and (6).

Furthermore, the signal processing section 4 calculates the tracking error signal STE in accordance with equation (12) on the basis of the main light reception values SA to SD and the sub light reception values SE and SF calculated using equations (7) to (10).

Therefore, as in the first embodiment, since the optical disc apparatus 70 can appropriately cancel out the stray-light components from the original light reception values SE0 and SF0, the sub light reception values SE and SF corresponding to the light amount of the sub beams of the reflected light beam LR can be calculated, whereby a high quality tracking error signal STE can be calculated. In consequence, the optical disc apparatus 70 can perform highly accurate tracking control on the basis of this tracking error signal STE by using the drive control section 3.

In this case, the optical pickup 77 uses the optical integrated unit 80 so that the optical pickup 77 and the entire optical disc apparatus 70 can be made smaller in size than in the first embodiment.

Furthermore, the optical disc apparatus 70 can achieve advantages similar to those of the first embodiment with regard to other points.

According to the above configuration, the optical disc apparatus 70 according to the third embodiment uses the hologram 84B to separate the reflected light beam LR into multiple beam components without rotating the images thereof, and emits the beam components to the photo-detector 18 provided with the stray-light-receiving region groups 18P and 18Q on the center point Q2 side of the light-receiving region groups 18B and 18C, respectively, and also provided with the stray-light-receiving region groups 18R and 18S on the side opposite the stray-light-receiving region groups 18P and 18Q with the light-receiving region groups 18B and 18C therebetween, respectively. The signal processing section 4 corrects each light reception signal U generated by the corresponding light-receiving region R on the basis of the two sub beams of each positive reflected light beam LR by using a sum value of the stray-light reception signals U generated by the individual stray-light-receiving regions R on the basis of the stray-light patterns W. Thus, the optical disc apparatus 70 cancels out the stray-light components so as to calculate the sub light reception values SE and SF corresponding to the light amount of the sub beams of the reflected light beam LR, whereby a high quality tracking error signal STE can be calculated.

4. Other Embodiments

In the first and third embodiments described above, the focus error signal SFE is generated using the SSD method, and in the second embodiment, the focus error signal SFE is generated using the Foucault method.

The present invention is not limited to these methods, and the focus error signal may be generated using other various methods of emitting the reflected light beam LR onto the photo-detector without rotating the image thereof. From a different viewpoint, it is sufficient so long as the direction in which the distribution of push-pull components on the photo-detector extends is substantially aligned with the direction in which the beam spots T move in response to a lens shift of the objective lens 8.

Furthermore, the above-described embodiments are directed to a case where the stray-light reception signals U are simply added in equations (3) and (4).

The present invention is not limited to this, and the addition may be implemented while, for example, multiplying each of the stray-light reception signals U obtained from the stray-light-receiving regions R of the stray-light-receiving region groups 18P and 18Q by a predetermined coefficient. The point is that it is sufficient so long as the sum values have a substantially proportional relationship with the stray-light components included in the original light reception values SE0 and SF0 so that the stray-light components can be appropriately corrected in accordance with equations (5) and (6).

Furthermore, in the above-described embodiments, a fixed coefficient $\alpha$ is constantly used in equations (5) and (6).

The present invention is not limited to this, and optimal coefficients may be used in a selectable manner in accordance with, for example, the target recording layer YT (FIGS. 2A and 2B). Thus, the stray-light components included in the original light reception values SE0 and SF0 can be cancelled out with even higher accuracy.

Furthermore, in the first embodiment described above, the regions 17X and 17Y of the hologram plate 17 have different diffraction angles so that positive and negative reflected light beams LR are each separated into two beam components in the radial direction.

The present invention is not limited to this, and the positive and negative reflected light beams LR may be directly emitted to the photo-detector 18 without separating the hologram plate 17 into multiple regions. In that case, however, the mounting positions of the optical components are preferably adjusted with high precision so that the center of the image of the positive reflected light beam LR is aligned with the center point Q2 of the photo-detector 18. The same applies to the third embodiment.

Furthermore, in the first embodiment described above, the inner stray-light-receiving regions, the sub light-receiving regions, and the outer stray-light-receiving regions have the same length in the radial direction (FIG. 8).

The present invention is not limited to this, and the inner stray-light-receiving regions, the sub light-receiving regions, and the outer stray-light-receiving regions may have different lengths. In that case, when adding the stray-light reception signals U in equations (3) and (4), each stray-light reception signal U may be multiplied by a predetermined coefficient so that the stray-light values SX and SY have a substantially proportional relationship with the stray-light components included in the original light reception values SE0 and SF0. The same applies to the second and third embodiments.

Furthermore, in the first embodiment described above, the grating 12 is configured to generate two sub beams, and the photo-detector 18 is provided with the two light-receiving region groups 18B and 18C serving as sub light-receiving regions.

The present invention is not limited to this, and, for example, the grating 12 may be configured to generate a single sub beam or three or more sub beams. In that case, the photo-detector 18 may be provided with sub light-receiving regions in correspondence with the number of sub beams, as well as inner stray-light-receiving regions and outer stray-light-receiving regions in correspondence with the sub light-receiving regions, and may be configured to correct the light reception signals U by using the stray-light reception signals U. The same applies to the second and third embodiments.

Furthermore, in the first embodiment described above, the optical pickup 7 is provided with the collimator lens 14 with a single-group/single-element composition.

The present invention is not limited to this, and a collimator lens formed of a combination of multiple lenses, such as a collimator lens with a two-group/two-element composition, may be used. In this case, since the focal length of the collimator lens formed of multiple lenses is shorter than the focal length of the collimator lens 14, the optical pickup 7 can be reduced in size.

On the other hand, in this case, the curvature of the boundary lines BX and BY shown in FIGS. 12A to 13C is further increased. With regard to this point, the stray-light components included in the original light reception values SE0 and SF0 can be appropriately corrected by using the stray-light reception signals U obtained by the stray-light-receiving regions R of the inner stray-light-receiving regions and the outer stray-light-receiving regions. The same applies to the third embodiment.

Furthermore, in the first embodiment described above, the optical disc apparatus 1 is configured to emit the light beam L toward the optical disc 100 having two recording layers Y.

The present invention is not limited to this, and the optical disc apparatus 1 may be configured to emit the light beam L toward an optical disc having three or more recording layers Y. In this case, although there is a possibility that various kinds of stray light from other layers might be emitted to the light-receiving region groups 18B and 18C, it is sufficient so long as the stray-light values SX and SY calculated in accordance with equations (3) and (4) have a substantially proportional relationship with the sum values of the stray-light components included in the original light reception values SE0 and SF0, and the stray-light components can be entirely cancelled out in accordance with equations (5) and (6). Moreover, in this case, the number of recording layers Y provided in the optical disc 100 may be determined by a predetermined layer-number determination process, and the coefficient α may be appropriately changed in accordance with the determined number of layers. The same applies to the second and third embodiments.

Furthermore, the first embodiment described above is applied to the optical disc apparatus 1 that records information onto the optical disc 100 and reproduces the information from the optical disc 100.

The present invention is not limited to this and may be applied to, for example, an optical-disc reproduction apparatus that reproduces the information from the optical disc 100. The same applies to the second and third embodiments.

Furthermore, in the above-described embodiment, the optical pickup 7 includes the laser diode 11 serving as a light source, the grating 12 serving as a diffraction element, the objective lens 8 as an objective lens, the drive control section 3 and the actuator 8A serving as a lens moving section, the hologram plate 17 serving as a light-separating element, and the photo-detector 18 serving as a light-receiving element.

However, the present invention is not limited to this, and the optical pickup may be constituted of a light source, a diffraction element, an objective lens, a lens moving section, a light-separating element, and a light-receiving element having other various configurations.

Furthermore, in the above-described embodiment, the optical disc apparatus 1 includes the laser diode 11 serving as a light source, the grating 12 serving as a diffraction element, the objective lens 8 as an objective lens, the drive control section 3 and the actuator 8A serving as a lens moving section, the hologram plate 17 serving as a light-separating element, the photo-detector 18 serving as a light-receiving element, and the signal processing section 4 as a signal processing section.

However, the present invention is not limited to this, and the optical disc apparatus may be constituted of a light source, a diffraction element, an objective lens, a lens moving section, a light-separating element, a light-receiving element, and a signal processing section having other various configurations.

The present application contains subject matter related to that disclosed in Japanese Priority Patent Application JP 2009-192646 filed in the Japan Patent Office on Aug. 22, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup comprising:
a light source to emit a light beam;
a diffraction element to diffract the light beam so as to separate the light beam into a main beam made of zero-th order light and at least one sub beam made of diffracted light;
an objective lens to focus the main beam and the at least one sub beam of the light beam onto a desired recording layer of an optical disc, the desired recording layer being a single recording layer or one of two or more recording layers provided in the optical disc and having helical or concentric tracks formed thereon;
a lens moving section to move the objective lens in a focusing direction for moving the objective lens toward and away from the optical disc and a tracking direction for moving the objective lens toward an inner periphery or an outer periphery of the optical disc;
a light-separating element to separate a reflected light beam, formed as a result of each of the main beam and the at least one sub beam of the light beam being reflected at the desired recording layer, into multiple beam components and allows the reflected light beam to travel without rotating an image thereof; and
a light-receiving element, comprising multiple light-receiving regions that optically receive the reflected light beam, to generate a light reception signal in accordance with the amount of received light so as to allow a predetermined signal processing section to generate a focus error signal and a tracking error signal at least in part on the basis of the light reception signal, the focus error signal and the tracking error signal indicating an amount of deviation between a focal point of the light beam and a desired one of the tracks in the focusing direction and the tracking direction, respectively, wherein the light-receiving element further comprises:

a main light-receiving region to optically receive a light beam component separated from the main beam of the reflected light beam by the light-separating element and to generate a main light reception signal in accordance with the amount of received light, an inner stray-light-receiving region that is provided adjacent to the main light-receiving region in a tangential direction, the inner stray-light-receiving region being configured to optically receive an interlayer stray light beam formed as a result of the light beam being reflected at an area other than the desired recording layer and to generate an inner stray-light reception signal in accordance with the amount of received light, a sub light-receiving region that is adjacent to the inner stray-light-receiving region in the tangential direction, corresponding to an extending direction of the tracks, in the image of the reflected light beam, the sub light-receiving region being configured to optically receive the at least one sub beam of the reflected light beam and to generate a sub light reception signal in accordance with the amount of received light, and an outer stray-light-receiving region provided adjacent to the sub light-receiving region in the tangential direction and on the opposite side from the inner stray-light receiving region and farther from the main light-receiving region than the inner stray-light receiving region, the outer stray-light-receiving region being configured to optically receive the interlayer stray light beam and to generate an outer stray-light reception signal in accordance with the amount of received light, and wherein the main light reception signal, the sub light reception signal, the inner stray-light reception signal, and the outer stray-light reception signal are supplied to the signal processing section so as to allow the signal processing section to generate the focus error signal on the basis of the main light reception signal and generate the tracking error signal at least in part on the basis of the main light reception signal and the sub light reception signal corrected by an average sum value of the inner stray-light reception signal and the outer stray-light reception signal.

2. The optical pickup according to claim 1, wherein the at least one sub beam includes two sub beams, wherein the light-separating element separates each of the main beam and the two sub beams of the reflected light beam into two beam components in a radial direction orthogonal to the tangential direction and allows the separated beam components to travel away from each other, and wherein the main light-receiving region, the sub light-receiving region, the inner stray-light-receiving region, and the outer stray-light-receiving region of the light-receiving element are each divided in the radial direction.

3. The optical pickup according to claim 1, wherein the light-separating element diffracts the reflected light beam so as to separate the reflected light beam into positive diffracted light and negative diffracted light, and also allows the positive diffracted light and the negative diffracted light to have different focal lengths, and wherein the light-receiving element includes two sets of the main light-receiving regions, each main light-receiving region being divided into three segments in the tangential direction, the light-receiving element allowing the signal processing section to generate the focus error signal by a spot-size-detecting method.

4. The optical pickup according to claim 1, wherein the inner stray-light-receiving region and the outer stray-light-receiving region each have a length, in a radial direction orthogonal to the tangential direction, that is equal to that of the sub light-receiving region.

5. The optical pickup according to claim 1, wherein the main light-receiving region is divided in the tangential direction.

6. An optical disc apparatus comprising:

a light source to emit a light beam;

a diffraction element to diffract the light beam so as to separate the light beam into a main beam made of zero-th order light and at least one sub beam made of diffracted light;

an objective lens to focus the main beam and the at least one sub beam of the light beam onto a desired recording layer of an optical disc, the desired recording layer being a single recording layer or one of two or more recording layers provided in the optical disc and having helical or concentric tracks formed thereon;

a lens moving section to move the objective lens in a focusing direction for moving the objective lens toward and away from the optical disc and a tracking direction for moving the objective lens toward an inner periphery or an outer periphery of the optical disc;

a light-separating element to separate a reflected light beam, formed as a result of each of the main beam and the at least one sub beam of the light beam being reflected at the desired recording layer, into multiple beam components and allows the reflected light beam to travel without rotating an image thereof;

a light-receiving element, comprising multiple light-receiving regions that optically receive the reflected light beam, to generate a light reception signal in accordance with the amount of received light; and a signal processing section to generate a focus error signal and a tracking error signal on the basis of the light reception signal, the focus error signal and the tracking error signal indicating an amount of deviation between a focal point of the light beam and a desired one of the tracks in the focusing direction and the tracking direction, respectively, wherein the light-receiving element further comprises:

a main light-receiving region to optically receive a light beam component separated from the main beam of the reflected light beam by the light-separating element and to generate a main light reception signal in accordance with the amount of received light, an inner stray-light-receiving region that is provided adjacent to the main light-receiving region in a tangential direction, the inner stray-light-receiving region being configured to optically receive an interlayer stray light beam formed as a result of the light beam being reflected at an area other than the desired recording layer and to generate an inner stray-light reception signal in accordance with the amount of received light, a sub light-receiving region that is adjacent to the inner stray-light-receiving region in the tangential direction, corresponding to an extending direction of the tracks, in the image of the reflected light beam, the sub light-receiving region being configured to optically receive the at least one sub beam of the reflected light beam and to generate a sub light reception signal in accordance with the amount of received light, and an outer stray-light-receiving region provided adjacent to the sub light-receiving region in the tangential direction and on the opposite side from the inner stray-light receiving region and farther from the main light-receiving region than the inner stray-light receiving region, the outer stray-light-receiving region being configured to optically receive the interlayer stray light beam and to generate an outer stray-light reception signal in accordance with the amount of received light, and wherein the signal processing section receives the main light reception signal, the sub light reception signal, the inner stray-light reception signal, and the outer stray-light reception signal so as to generate the focus error signal at least in part on the basis of the main light reception signal and generate the tracking error signal on the basis of the main light reception signal and the sub light reception signal corrected by an average sum value of the inner stray-light reception signal and the outer stray-light reception signal.

7. The optical disc apparatus according to claim 6, wherein the at least one sub beam includes two sub beams, wherein the light-separating element separates each of the main beam and the two sub beams of the reflected light beam into two beam components in a radial direction orthogonal to the tangential direction and allows the separated beam components to travel away from each other, and wherein the main light-receiving region, the sub light-receiving region, the inner stray-light-receiving region, and the outer stray-light-receiving region of the light-receiving element are each divided in the radial direction.

8. The optical disc apparatus according to claim 6, wherein the light-separating element diffracts the reflected light beam so as to separate the reflected light beam into positive diffracted light and negative diffracted light, and also allows the positive diffracted light and the negative diffracted light to have different focal lengths, and wherein the light-receiving element includes two sets of the main light-receiving regions, each main light-receiving region being divided into three segments in the tangential direction, the light-receiving element allowing the signal processing section to generate the focus error signal by a spot-size-detecting method.

9. The optical disc apparatus according to claim 6, wherein the inner stray-light-receiving region and the outer stray-light-receiving region each have a length, in a radial direction orthogonal to the tangential direction, that is equal to that of the sub light-receiving region.

10. The optical disc apparatus according to claim 6, wherein the main light-receiving region is divided in the tangential direction.

* * * * *